US010148320B2

(12) United States Patent
Shin et al.

(10) Patent No.: US 10,148,320 B2
(45) Date of Patent: Dec. 4, 2018

(54) WIRELESS POWER TRANSMITTING DEVICE AND METHOD FOR CONTROLLING THE SAME

(71) Applicant: Samsung Electronics Co., Ltd., Gyeonggi-do (KR)

(72) Inventors: Jae-Hyuck Shin, Gyeonggi-do (KR); Kyung-Woo Lee, Seoul (KR); Sang-Wook Lee, Gyeonggi-do (KR); Chang-Hyun Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/475,267

(22) Filed: Mar. 31, 2017

(65) Prior Publication Data
US 2017/0288739 A1 Oct. 5, 2017

Related U.S. Application Data

(60) Provisional application No. 62/315,869, filed on Mar. 31, 2016.

(30) Foreign Application Priority Data

Aug. 17, 2016 (KR) .................. 10-2016-0104168

(51) Int. Cl.
H04B 5/00 (2006.01)
H04B 17/27 (2015.01)
(Continued)

(52) U.S. Cl.
CPC ......... H04B 5/0037 (2013.01); H04B 17/101 (2015.01); H04B 17/327 (2015.01);
(Continued)

(58) Field of Classification Search
CPC ...... H04B 5/0037; H04B 17/327; H04B 7/04; H04B 7/0897; H04B 17/27; H04B 7/043;
(Continued)

(56) References Cited

U.S. PATENT DOCUMENTS

2011/0087306 A1* 4/2011 Goossen .............. A61N 1/3718
607/60
2013/0053059 A1 2/2013 Kruglick
(Continued)

FOREIGN PATENT DOCUMENTS

KR 1020110099485 9/2011
KR 1020140123222 10/2014
KR 1020160034098 3/2016
WO WO 2014/052070 4/2014

OTHER PUBLICATIONS

International Search Report dated Jul. 10, 2017 issued in counterpart application No. PCT/KR2017/003490, 9 pages.

Primary Examiner — Andrew Wendell
(74) Attorney, Agent, or Firm — The Farrell Law Firm, P.C.

(57) ABSTRACT

Methods and apparatuses are provided for controlling a wireless power transmitting device. Information is received about a position of an electronic device from another wireless power transmitting device. Power is transmitted to the electronic device using the information about the position of the electronic device received from the other wireless power transmitting device.

18 Claims, 26 Drawing Sheets

(51) Int. Cl.
*H04W 16/28* (2009.01)
*H04W 4/02* (2018.01)
*H04M 15/00* (2006.01)
*H04B 17/327* (2015.01)
*H04W 36/08* (2009.01)
*H04W 52/28* (2009.01)
*H04W 52/42* (2009.01)
*H04B 17/10* (2015.01)
*H04B 7/04* (2017.01)
*H04W 4/70* (2018.01)

(52) U.S. Cl.
CPC ....... *H04M 15/8207* (2013.01); *H04W 4/023* (2013.01); *H04W 36/08* (2013.01); *H04W 52/283* (2013.01); *H04W 52/42* (2013.01); *H04B 7/04* (2013.01); *H04B 17/102* (2015.01); *H04W 4/70* (2018.02)

(58) Field of Classification Search
CPC .... H04B 7/0617; H04B 7/0695; H04B 7/088; H04W 36/08; H04W 4/023; H04W 4/005; H04W 52/52; H04W 16/28; H04W 4/026; H04M 15/8207
See application file for complete search history.

(56) References Cited

U.S. PATENT DOCUMENTS

| | | | |
|---|---|---|---|
| 2014/0197785 A1* | 7/2014 | Lee | H02J 7/025 320/108 |
| 2015/0188365 A1* | 7/2015 | Wang | H01Q 7/00 307/104 |
| 2015/0198676 A1* | 7/2015 | Min | G01R 31/3679 320/114 |
| 2016/0056669 A1 | 2/2016 | Bell | |
| 2016/0056966 A1 | 2/2016 | Bell | |
| 2016/0099611 A1 | 4/2016 | Leabman et al. | |
| 2016/0099755 A1 | 4/2016 | Leabman et al. | |
| 2016/0100124 A1 | 4/2016 | Leabman et al. | |
| 2016/0135007 A1* | 5/2016 | Persson | H04W 4/023 455/456.2 |
| 2016/0197495 A1* | 7/2016 | Jung | H01F 38/14 307/104 |
| 2017/0005520 A1* | 1/2017 | Zeine | H02J 50/20 |
| 2017/0018954 A1* | 1/2017 | Lee | H04B 5/0081 |
| 2017/0187198 A1* | 6/2017 | Leabman | H02J 5/005 |
| 2017/0256994 A1* | 9/2017 | Joyce | H02J 50/90 |
| 2017/0280281 A1* | 9/2017 | Pandey | H04W 4/02 |
| 2017/0288475 A1* | 10/2017 | Lee | H02J 50/90 |

* cited by examiner

WIRELESS POWER TRANSMITTING DEVICE AND METHOD FOR CONTROLLING THE SAME

PRIORITY

This application claims priority under 35 U.S.C. § 119(a) to U.S. Provisional Patent Application No. 62/315,869 filed in the U.S. Patent and Trademark Office on Mar. 31, 2016, and Korean Patent Application No. 10-2016-0104168 filed in the Korean Intellectual Property Office on Aug. 17, 2016, the disclosures of which are incorporated herein by reference.

BACKGROUND

1. Field of the Disclosure

The present disclosure relates generally to wireless power transmitting devices and methods for controlling the same, and more particularly, to wireless power transmitting devices capable of wirelessly transmitting power to electronic devices and methods for controlling the same.

2. Description of the Related Art

Users of portable digital communication devices desire to receive various high-quality services anytime, anywhere. Internet of things (IoT) technology bundles various sensors, home appliances, and communication devices into a single network. A diversity of sensors require a wireless power transmission system for seamless operation.

Wireless power transmission may come in various types, such as, for example, magnetic induction, magnetic resonance, and electromagnetic waves. The electromagnetic wave type of wireless power transmission may advantageously work within a few meters as compared with the other types.

The electromagnetic wave type of wireless power transmission is primarily intended for remote power transmission and may exactly determine the location of remote power receivers and deliver power in a most efficient way.

In order to determine the position of a target for charging (e.g., an electronic device), a conventional electromagnetic wave scheme forms radio frequency (RF) waves in multiple directions, receives power-related information from the electronic device, and uses the received information to determine the position of the electronic device. However, the formation of RF waves in multiple directions and the reception of power-related information may take a long amount of time. In such a case, it is not secure to fix the electronic device to one position. In particular, due to the potential harm to human bodies, high-power transmission is impossible before detecting a target for charging.

When the user carries or puts on a small electronic device, the electronic device may be subject to frequent changes in position. When an electronic device moves in an environment in which a plurality of wireless power transmitting devices are arranged, an issue may arise where a new wireless power transmitting device needs to determine the position of the electronic device.

SUMMARY

The present disclosure has been made to address at least the above problems and/or disadvantages and to provide at least the advantages described below. Accordingly, an aspect of the present disclosure provides a wireless power transmitting device capable of sharing information about the position of an electronic device with another wireless power transmitting device.

Another aspect of the present disclosure provides a wireless power transmitting device, enabling the charging of an electronic device, that hands off to another wireless power transmitting device.

According to an embodiment of the present disclosure, a wireless power transmitting device is provided that includes a plurality of patch antennas, and a communication circuit. The wireless power transmitting device also includes a processor configured to control to receive information about a position of an electronic device from another wireless power transmitting device, and control to transmit, through the plurality of patch antennas, power to the electronic device based on the received information about the position of the electronic device received from the other wireless power transmitting device.

According to an embodiment of the present disclosure, a wireless power transmitting device is provided that includes a plurality of patch antennas transmitting power, and a plurality of communication antennas. The wireless power transmitting device also includes a processor configured to receive, through each of the plurality of communication antennas, a first communication signal from an electronic device, and determine a direction toward which the electronic device is positioned based on each of a plurality of time points for reception of the first communication signal by each of the plurality of communication antennas, control to transmit, through the plurality of patch antennas, the power to the electronic device using the direction toward which the electronic device is positioned, and send a second communication signal including the direction toward which the electronic device is positioned to another wireless power transmitting device.

According to an embodiment of the present disclosure, an electronic device is provided that includes a power reception antenna configured to receive power from a first wireless power transmitting device, and a communication circuit. The electronic device also includes a processor configured to control to receive, through the power reception antennas, power from a first wireless power transmitting device, send a handoff request signal to the first wireless power transmitting device through the communication circuit upon determining that each of at least one of a current, a voltage, and a power at a point of the electronic device is less than each of at least one of a preset threshold current, preset threshold voltage, preset threshold power and control to receive, through the power reception antennas, power from a second wireless power transmitting device that is different from the first wireless power transmitting device after sending the handoff request signal.

According to an embodiment of the present disclosure, a method for controlling a wireless power transmitting device is provided. Information is received about a position of an electronic device from another wireless power transmitting device. Power is transmitted to the electronic device using the information about the position of the electronic device received from the other wireless power transmitting device.

According to an embodiment of the present disclosure, a method for controlling a wireless power transmitting device is provided. A first communication signal is received from an electronic device. A direction toward which the electronic device is positioned is determined based on each of a plurality of time points for reception of the first communication signal by each of the plurality of communication antennas. The power is transmitted to the electronic device using the direction toward which the electronic device is positioned. A second communication signal including the direction toward which the electronic device is positioned is sent to another wireless power transmitting device.

According to an embodiment of the present disclosure, a method for controlling an electronic device is provided. Power is received from a first wireless power transmitting device. A handoff request signal is sent to the first wireless power transmitting device upon determining that each of at least one of a current, a voltage, and a power is less than each of at least one of a preset threshold current, a preset threshold voltage, and a preset threshold power. Power is received from a second wireless power transmitting device different from the first wireless power transmitting device after sending the handoff request signal.

BRIEF DESCRIPTION OF THE DRAWINGS

The above and other aspects, features, and advantages of the present disclosure will be more apparent from the following detailed description when taken in conjunction with the accompanying drawings, in which.

DETAILED DESCRIPTION

Figure 1:
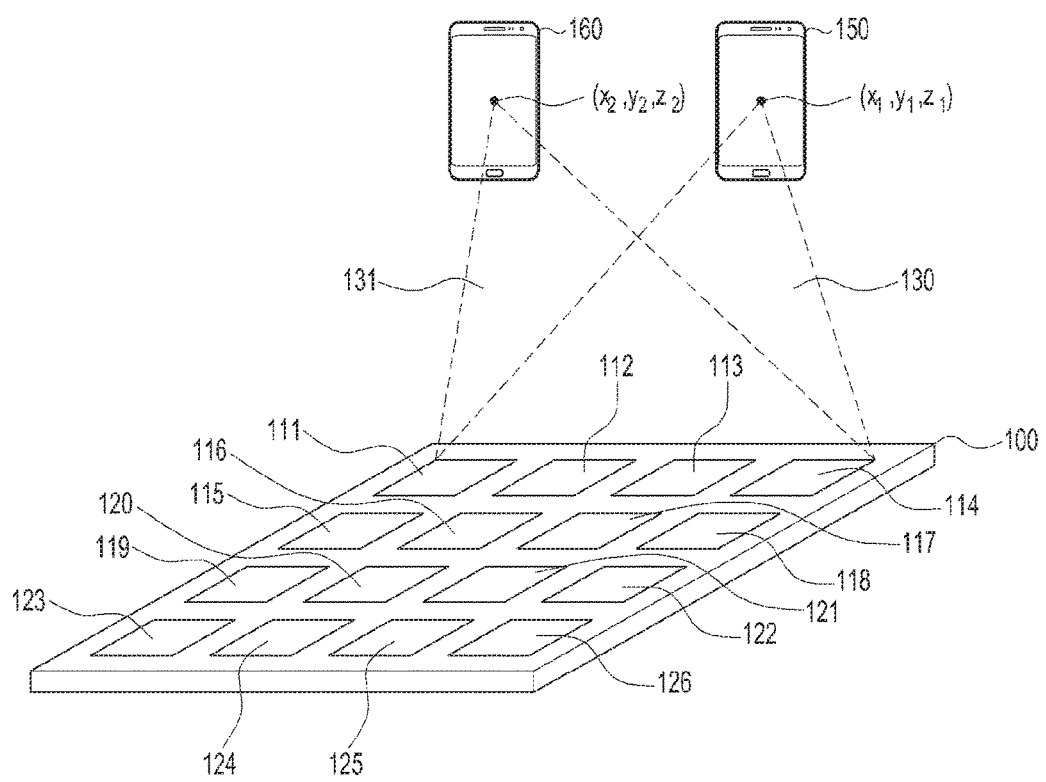
FIG. 1 is a diagram illustrating a wireless power transmission system, according to an embodiment of the present disclosure.

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

It is to be understood that the singular forms "a," "an," and "the" include plural references unless the context clearly dictates otherwise. As used herein, the terms "A or B" or "at least one of A and/or B" may include all possible combinations of A and B. As used herein, the terms "first" and "second" may modify various components regardless of importance and/or order and are used to distinguish one component from another component without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the expression "configured to" may be interchangeably used with other expressions, such as "suitable for," "capable of," "modified to," "made to," "adapted to," "able to," or "designed to" in hardware or software in the context. The expression "configured to" may mean that a device can perform an operation together with other device or parts. For example, the expression "processor configured (or set) to perform A, B, and C" may mean a generic-purpose processor (e.g., a central processing unit (CPU) or application processor (AP)) that may perform the operations by executing one or more software programs stored in a memory device or a dedicated processor (e.g., an embedded processor) for performing the operations.

Examples of a wireless power transmitting device or electronic device, according to embodiments of the present disclosure, may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a MP3 player, a medical device, a camera, or a wearable device. The wearable device may include at least one of an accessory-type device (e.g., a watch, a ring, a bracelet, an anklet, a necklace, glasses, contact lenses, or a head-mounted device (HIVID)), a fabric- or clothes-integrated device (e.g., electronic clothes), a body attaching-type device (e.g., a skin pad or tattoo), or a body implantable device. Examples of the wireless power transmitting device or electronic device may include at least one of a television, a digital versatile disc (DVD) player, an audio player, a refrigerator, an air conditioner, a cleaner, an oven, a microwave oven, a washer, a drier, an air cleaner, a set-top box, a home automation control panel, a security control panel, a media box, a gaming console, an electronic dictionary, an electronic key, a camcorder, or an electronic picture frame.

According to an embodiment of the present disclosure, examples of the wireless power transmitting device or electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, drones, automatic teller machines (ATMs), point of sales (POS) devices, or IoT devices (e.g., a light bulb, various sensors, a sprinkler, a fire alarm, a thermostat, a street light, a toaster, fitness equipment, a hot water tank, a heater, or a boiler).

According to various embodiments of the disclosure, examples of the wireless power transmitting device or electronic device may be at least one of part of a piece of furniture, building/structure or vehicle, an electronic board, an electronic signature receiving device, a projector, or various measurement devices (e.g., devices for measuring water, electricity, gas, or electromagnetic waves). The wireless power transmitting device or electronic device may be flexible or may be a combination of the above-described electronic devices. The wireless power transmitting device or electronic device is not limited to the above-described embodiments. As used herein, the term "user" may denote a human using the electronic device or another device (e.g., an artificial intelligence electronic device) using the wireless power transmitting device or electronic device.

FIG. 1 is a diagram illustrating a wireless power transmission system, according to an embodiment of the present disclosure.

A wireless power transmitting device 100 may wirelessly transmit to at least one electronic device 150 or 160. The wireless power transmitting device 100 includes a plurality of patch antennas 111 to 126. The patch antennas 111 to 126 are not limited as long as they are each an antenna capable of generating RF waves. At least one of the amplitude and phase of RF waves generated by the patch antennas 111 to 126 may be adjusted by the wireless power transmitting device 100. For ease of description, an RF wave generated by a single patch antenna may be denoted sub-RF waves.

According to an embodiment of the present disclosure, the wireless power transmitting device 100 may adjust at least one of the amplitude and phase of each of the sub-RF waves respectively generated by the patch antennas 111 to 126. The sub-RF waves may interfere with each other. For example, the sub-RF waves may constructively interfere with each other at one point or destructively interfere with each other at another point. The wireless power transmitting device 100 may adjust at least one of the amplitude and phase of each of the sub-RF waves generated by the patch antennas 111 to 126 so that the sub-RF waves may constructively interfere with each other at a first point (x1, y1, z1).

For example, the wireless power transmitting device 100 may determine that an electronic device 150 is positioned at the first point (x1, y1, z1). Here, the position of the electronic device 150 may be where a power receiving antenna of the electronic device 150 is located. A method for determining the position of the electronic device 150 is described in greater detail below. In order for the electronic device 150 to wirelessly receive power at relatively higher transmission efficiency, the sub-RF waves should constructively interfere with each other at the first point (x1, y1, z1). Accordingly, the wireless power transmitting device 100 may control the patch antennas 111 to 126 so that the sub-RF waves may constructively interfere with one another at the first point (x1, y1, z1). Controlling the patch antennas 111 to 126 may mean controlling the magnitude of signals inputted to the patch antennas 111 to 126 or controlling the phase (or delay) of signals inputted to the patch antennas 111 to 126. Beamforming, a technique for controlling RF waves to be subject to constructive interference at a certain point, would readily be appreciated by one of ordinary skill in the art. It is also appreciated by one of ordinary skill in the art that the beamforming used herein is not particularly limited in type. An RF wave formed by beamforming may be denoted a pocket of energy.

Hence, an RF wave 130 formed by the sub-RF waves may have a maximum amplitude at the first point (x1, y1, z1), and thus, the electronic device 150 may receive power at a higher efficiency. Meanwhile, the wireless power transmitting device 100 may detect that an electronic device 160 is positioned at a second point (x2, y2, z2). The wireless power transmitting device 100 may control the patch antennas 111 to 126 so that the sub-RF waves may constructively interfere with each other at the second point (x2, y2, z2) in order to charge the electronic device 160. Hence, an RF wave 131 formed by the sub-RF waves may have a maximum amplitude at the second point (x2, y2, z2), and thus, the electronic device 160 may receive power at a higher efficiency.

Specifically, the electronic device 150 may be positioned at a right side. In this case, the wireless power transmitting device 100 may apply a relatively larger delay to sub-RF waves formed by the patch antennas positioned at a right side (e.g., 114, 118, 122, and 126). In other words, a predetermined time after the sub-RF waves are formed by patch antennas positioned at a left side (e.g., 111, 115, 119, and 123), sub-RF waves may be generated by the patch antennas positioned relatively at a right side (e.g., 114, 118, 122, and 126). Thus, the sub-RF waves may simultaneously meet at a relatively right-side point. Specifically, the sub-RF waves may constructively interfere with each other at the relatively right-side point. Where beamforming is conducted at a relatively middle point, the wireless power transmitting device 100 may apply substantially the same delay to the left-side patch antennas (e.g., 111, 115, 119, and 123) and the right-side patch antennas (e.g., 114, 118, 122, and 126). Further, when beamforming is conducted at a relatively left-side point, the wireless power transmitting device 100 may apply a larger delay to the left-side patch antennas (e.g., 111, 115, 119, and 123) than to the right-side patch antennas (e.g., 114, 118, 122, and 126). According to an embodiment of the present disclosure, the wireless power transmitting device 100 may substantially simultaneously generate sub-RF waves through all of the patch antennas 111 to 126, and may perform beamforming by adjusting the phase corresponding to the above-described delay.

As described above, the wireless power transmitting device 100 may determine the position of the electronic devices 150 and 160 and enable the sub-RF waves to constructively interfere with each other at the determined position, allowing for wireless charging at a higher transmission efficiency. Meanwhile, the wireless power transmitting device 100 may be capable of high-transmission efficiency wireless charging only when it can exactly determine the position of the electronic devices 150 and 160.

Figure 2:
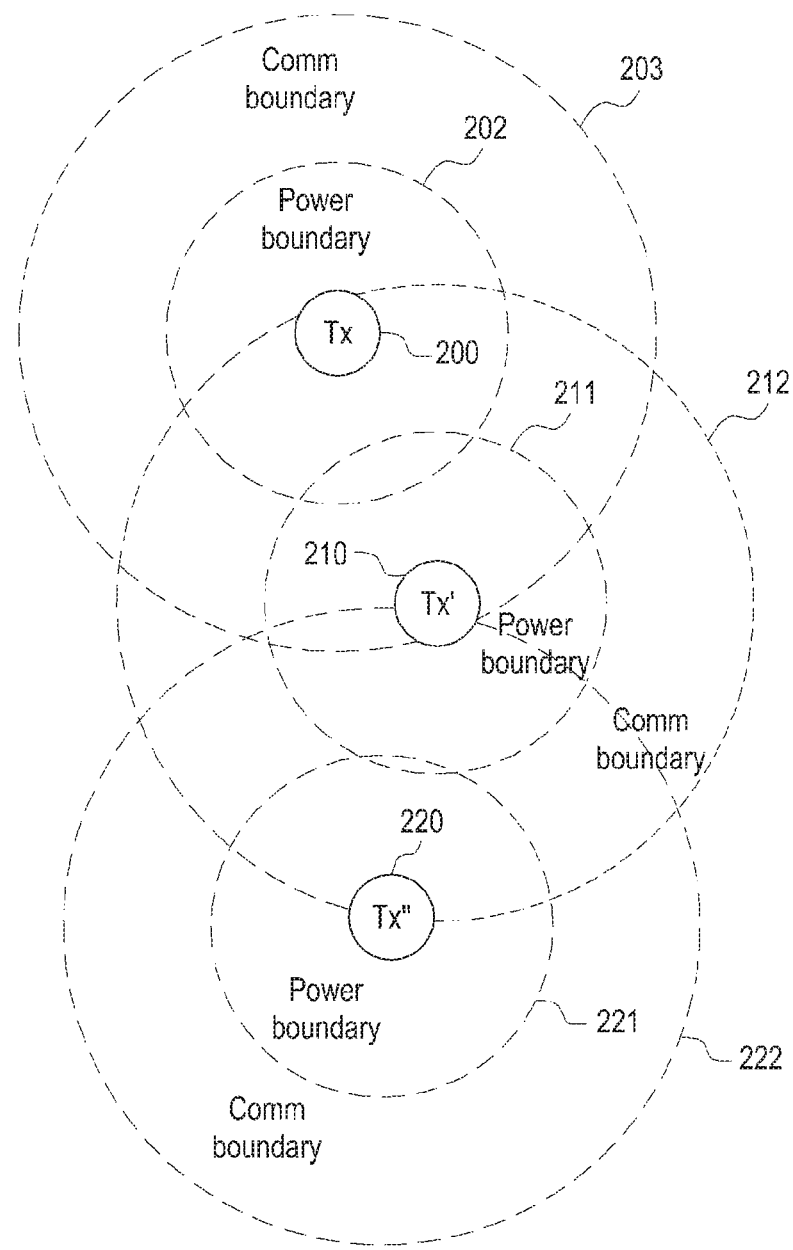
FIG. 2 is a diagram illustrating an environment where a plurality of wireless power transmitting devices are arranged, according to an embodiment of the present disclosure.

FIG. 2 is a diagram illustrating an environment in which a plurality of wireless power transmitting devices are arranged, according to an embodiment of the present disclosure.

A first wireless power transmitting device 200 transmits power within a power boundary 202. The power boundary 202 is a distance limit within which the first wireless power transmitting device 200 may transmit power. An RF wave output from the first wireless power transmitting device 200 may attenuate as the transmission distance increases, and the power boundary 202 may also refer to a point where the magnitude of the outputted RF wave is less than or equal to a preset threshold. The first wireless power transmitting device 200 transmits or receives a communication signal within a communication (Comm) boundary 203. The communication boundary 203 is a distance limit within which the first wireless power transmitting device 200 may conduct communication. A second wireless power transmitting device 210 transmits power within a power boundary 211 and conducts communication within a communication boundary 212. A third wireless power transmitting device 220 transmits power within a power boundary 221 and conducts communication within a communication boundary 222. As illustrated in FIG. 2, the communication boundaries 203, 212, and 222 are broader than the power boundaries 202, 211, and 221. The first wireless power transmitting device 200, the second wireless power transmitting device 210, and the third wireless power transmitting device 220 may be arranged so that there is no shadow area for power transmission in a particular region. The power boundaries 202, 211, and 221 partially overlap each other. The wireless power transmitting devices 200, 210, and 220 may determine and previously store a state of arrangement (i.e., topology) of the wireless power transmitting devices 200, 210, and 220. For example, the first wireless power transmitting device 200 may determine and previously store a relative position of the second wireless power transmitting device 210. Further, the first wireless power transmitting device 200 may also store hop information indicating that the hop to the second wireless power transmitting device 210 is 1, and the hop to the third wireless power transmitting device 220 is 2. A wireless power transmitting device may transmit and receive data with another wireless power transmitting device using the above-described topology. The topology may comprise at least one of geographical information of wireless power transmitting devices 200, 210 and 220 and hop information between wireless power transmitting devices 200, 210 and 220. A wireless power transmitting device may update and store the topology when its position changes.

Figure 3:
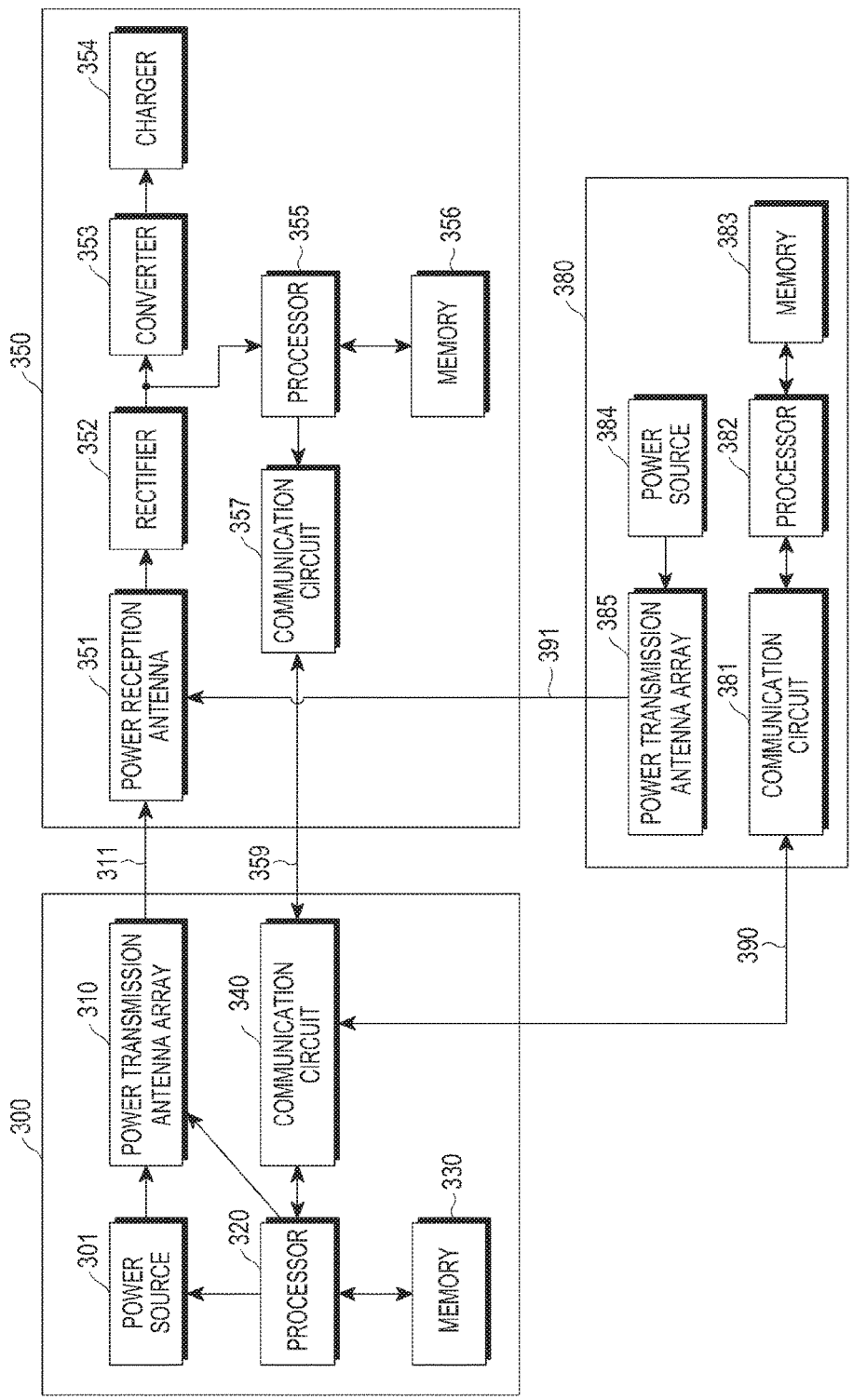
FIG. 3 is a block diagram illustrating a wireless power transmitting device and a wireless power receiving device, according to an embodiment of the present disclosure.

FIG. 3 is a block diagram illustrating a wireless power transmitting device and a wireless power receiving device, according to an embodiment of the present disclosure.

A wireless power transmitting device 300 includes a power source 301, a power transmission antenna array (or an antenna array for power transmission) 310, a processor 320, a memory 330, a communication circuit 340, and antennas for communication. An electronic device 350 is not limited as long as it is a device capable of wirelessly receiving power and includes a power reception antenna (or an antenna for power reception) 351, a rectifier 352, a converter 353, a charger 354, a processor 355, a memory 356, a communication circuit 357, and an antenna for communication.

The power source 301 may provide power for transmission to the power transmission antenna array 310. The power source 301 may provide, e.g., direct current (DC) power, in which case the wireless power transmitting device 300 may further include an inverter that converts DC power into alternating current (AC) power and delivers the AC power to the power transmission antenna array 310. According to an embodiment of the present disclosure, the power source 301 may provide AC power to the power transmission antenna array 310.

The power transmission antenna array 310 may include a plurality of patch antennas. For example, a plurality of patch antennas as shown in FIG. 1 may be included in the power transmission antenna array 310. The number or array form of the plurality of patch antennas is not limited. The power transmission antenna array 310 may form an RF wave using the power received from the power source 301. The power transmission antenna array 310 may form an RF wave in a particular direction under the control of the processor 320. Forming an RF wave in a particular direction may mean controlling at least one of the amplitude and phase of sub-RF waves so that the sub-RF waves constructively interfere with each other at a point in the particular direction. For example, the processor 320 may control at least one phase shifter included or connected to the power transmission antenna array 310 to form an RF wave in a particular direction. For example, the processor 320 may control each gain of at least one power amplifier included or connected to the power transmission antenna array 310 to form an RF wave in a particular direction.

The processor 320 may determine the direction in which the electronic device 350 is positioned, and may determine the direction of formation of the RF wave based on the determined direction of the electronic device 350. Specifically, the processor 320 may control the patch antennas of the power transmission antenna array 310 that generates sub-RF waves so that the sub-RF waves constructively interfere with each other at one point in the determined direction. For example, the processor 320 may control at least one of the amplitude and phase of the sub-RF wave generated from each patch antenna by controlling the patch antennas or a control means (e.g., an amplifier, a phase shifter, or a delay component) connected with the patch antennas.

The processor 320 may determine the direction in which the electronic device 350 is positioned using communication signals received from the communication circuit 340. Specifically, the processor 320 may control at least one of the amplitude and phase of the sub-RF wave generated from each patch antenna using the communication signals received from the communication circuit 340. The communication circuit 357 of the electronic device 350 may send or receive a communication signal 359. Meanwhile, a plurality of time points for reception of the communication signal 359 by a plurality of communication antennas connected to the communication circuit 340 may differ. This is described in greater detail below with reference to FIG. 6.

The processor 320 of the wireless power transmitting device 300 may determine a direction of the electronic device 350 relative to the wireless power transmitting device 300 using times of reception (e.g., t1, t2, and t3) of the communication signal by the plurality of communication antennas connected to the communication circuit 340. For example, the processor 320 of the wireless power transmitting device 300 may determine a direction of the electronic device 350 relative to the wireless power transmitting device 300 using information about time differences t1-t2, t2-t3, and t3-t1. The processor 320 may determine a relative direction of the electronic device 350 using a program or algorithm capable of determining a direction and stored in, e.g., the memory 330. Or, the processor 320 may determine a relative direction of the electronic device 350 using a lookup table between the direction of the electronic device and the difference in reception time per communication antenna, which is stored in, e.g., the memory 330. The wireless power transmitting device 300 (or the processor 320) may determine a relative direction of the electronic device 350 in various manners. For example, the wireless power transmitting device 300 (or the processor 320) may determine a relative direction of the electronic device 350 in various ways, such as time difference of arrival (TDOA) or frequency difference of arrival (FDOA), and the program or algorithm determining the direction of received signal is not limited in type.

The processor 320 may form an RF wave in the direction of the electronic device 350 by controlling, for example, the power transmission antenna array 310 or at least one phase shifter or at least one power amplifier connected to the power transmission antenna array 310 based on the direction of the electronic device 350. The processor 320 may identify the electronic device 350 using information contained in the communication signal 359. The communication signal 359 may include the unique identifier and unique address of the electronic device. The communication circuit 340 may process the communication signal 359 and provide information to the processor 320. The communication circuit 340 and the communication antennas may be manufactured based on various communication schemes, such as, for example, wireless-fidelity (Wi-Fi), bluetooth, zig-bee, near-field communication (NFC), and bluetooth low energy (BLE). The communication signal 359 may include rated power information about the electronic device 350. The processor 320 may determine whether to charge the electronic device 350 based on at least one of the unique identifier, unique address, and rated power information of the electronic device 350.

Further, the communication signal may be used in the process for the wireless power transmitting device 300 to identify the electronic device 350, the process to send out information permitting power transmission in response to a request for power transmission from the electronic device 350, the process of sending a request for receive (RX) power-related information to the electronic device 350, and the process of receiving the received power-related information from the electronic device 350. Specifically, the wireless power transmitting device 300 may compare rated voltage information of the electronic device 350 with a magnitude of power currently providable, and when the rated voltage is greater than the magnitude of power providable, the wireless power transmitting device 300 may send a signal disallowing charging to the electronic device 350. When the magnitude of power providable is not less than the rated voltage, the wireless power transmitting device 300 may send a signal permitting charging to the electronic device 350 and proceeding with a subsequent charging process. Specifically, the communication signal may be used in a process for a subscription, command, or request between the wireless power transmitting device 300 and the electronic device 350.

The processor 320 may control the power transmission antenna array 310 to form an RF wave 311 in the determined direction of the electronic device 350. The processor 320 may form an RF wave for detection and determine the distance to the electronic device 350 using another communication signal subsequently received as a feedback, which is described in greater detail below.

The processor 320 may determine both the direction of the electronic device 350 and the distance to the electronic device 350, and may thus determine the position of the electronic device 350. The processor 320 may control the patch antennas so that the sub-RF waves generated from the patch antennas may constructively interfere with one another at the position of the electronic device 350. Therefore, the RF wave 311 may be transferred to the power reception antenna 351 at relatively high transmission efficiency. Further, as the direction of the electronic device 350 is determined by communication signals, the position of the electronic device 350 may be determined swiftly.

The power reception antenna 351 is not limited as long as it is an antenna capable of receiving RF waves. Further, the power reception antenna 351 may be implemented in the form of an array of a plurality of antennas. The AC power received by the power reception antenna 351 may be rectified into DC power by the rectifier 352. The converter 353 may convert the DC power into a voltage required and provide the voltage to the charger 354. The charger 354 may charge a battery. The converter 353 may provide the converted power to a power management integrated circuit (PMIC), and the PMIC may provide power to various hardware structures of the electronic device 350. According to another embodiment, the electronic device 350 may not include the charger 354. In this embodiment, the converter 353 may directly charge the battery of the electronic device 350.

The processor 355 may monitor the voltage at the output end of the rectifier 352. For example, the electronic device 350 may further include a voltage meter connected to the output end of the rectifier 352. The processor 355 may receive a voltage value from the voltage meter and monitor the voltage at the output end of the rectifier 352. The processor 355 may provide information containing the voltage value at the output end of the rectifier 352 to the communication circuit 357. The communication circuit 357 may send out a communication signal including received power-related information, which is information about power received by the electronic device 350, to the wireless power transmitting device 300 through the communication antenna. The received power-related information may be information associated with the magnitude of power received, such as, for example, the voltage at the output end of the rectifier 352, and may contain a current at the output end of the rectifier 352. In this case, it will readily be appreciated by one of ordinary skill in the art that the electronic device 350 may further include a current meter capable of measuring current at the output end of the rectifier 352. The current meter may be implemented in various types, such as, for example, a DC current meter, an AC current meter, or a digital current meter. The voltage meter may be implemented in various types, such as, for example, an electrodynamic instrument voltage meter, an electrostatic voltage meter, or a digital voltage meter. Further, the received power-related information may be measured not only at the output end of the rectifier 352 but also at other points of the electronic device 350.

As set forth above, the processor 357 may send out a communication signal 359 containing identification information about the electronic device 350. The memory 356 may store a program or algorithm capable of controlling various hardware units of the electronic device 350. The program and algorithm may be downloaded from a server.

The processor 320 may control the communication circuit 340 to transmit the determined direction of the electronic device 350 to another wireless power transmitting device 380 so that the determined direction may be shared with the other wireless power transmitting device 380. For example, a communication circuit 381 of the other wireless power transmitting device 380 may receive information about the position of the electronic device 350, which is transmitted through the communication circuit 340 of the wireless power transmitting device 300. The information about the position of the electronic device 350 may include a direction or position of the electronic device 350 with respect to the wireless power transmitting device 300.

The other wireless power transmitting device 380 may charge the electronic device 350 using information 390 about the position of the electronic device 350 received from the wireless power transmitting device 300. A processor 382 may determine a direction in which a power transmission antenna array 385 is to form an RF wave 391 using the information 390 about the position of the electronic device 350 received through the communication circuit 381. Specifically, the processor 382 may control at least one of the phase and amplitude of each patch antenna of the power transmission antenna array 385 based on the information about the position of the electronic device 350 received through the communication circuit 381. Accordingly, the power transmission antenna array 385 may enable sub-RF waves to constructively interfere with one another at the point where the electronic device 350 is positioned using power from a power source 384. A memory 383 may store, in a lookup table, the relationship between at least one of the phase and amplitude of each patch antenna of the power transmission antenna array 385 and the received information about the position of the electronic device 350. Or, the memory 383 may store an algorithm capable of determining at least one of the phase and amplitude of each patch antenna of the power transmission antenna array 385 using the received information about the position of the electronic device 350.

The processor 382 may determine at least one of the phase and amplitude of each patch antenna of the power transmission array antenna 385 using the lookup table or algorithm. As described above, the processor 382 may omit at least some procedures for determining the position of the electronic device 350 by using the information 390 about the position of the electronic device 350 shared by the wireless power transmitting device 300, allowing for quick wireless charging. In particular, as there may be a change of wireless power transmitting devices to perform charging within a short time where the electronic device 350 frequently moves, a handoff for wireless charging may be possible.

According to an embodiment of the present disclosure, the wireless power transmitting device 300 and the other wireless power transmitting device 380 may simultaneously charge the electronic device 350.

Figure 4:
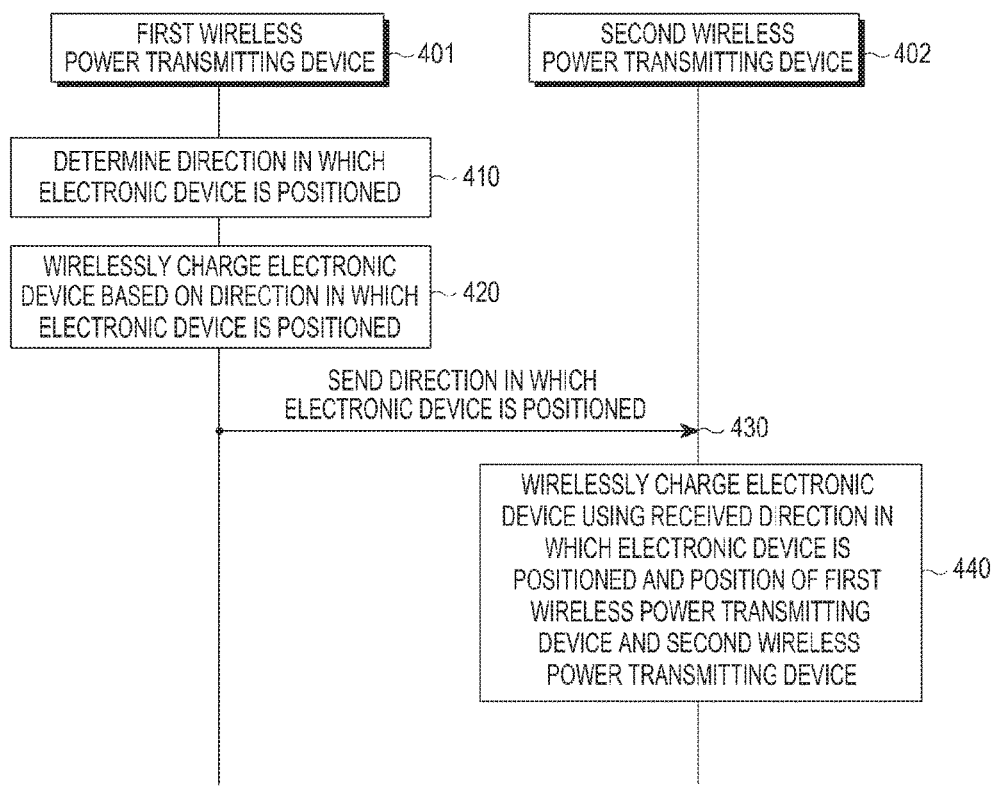
FIG. 4 is a flowchart illustrating a method for controlling a wireless power transmitting device, according to an embodiment of the present disclosure.
Figure 5:
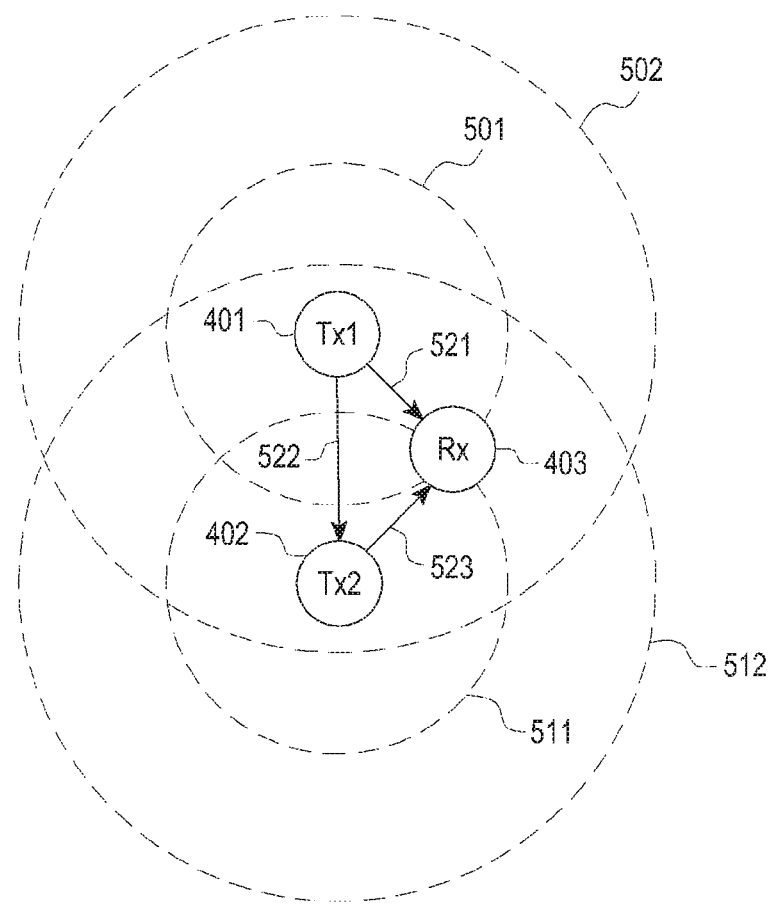
FIG. 5 is a diagram illustrating an environment where a plurality of wireless power transmitting devices are arranged, according to an embodiment of the present disclosure.

FIG. 4 is a flowchart illustrating a method for controlling a wireless power transmitting device according to an embodiment of the present disclosure. The embodiment shown in FIG. 4 is described in greater detail with reference to FIG. 5. FIG. 5 is a diagram illustrating an environment in which a plurality of wireless power transmitting devices are arranged, according to an embodiment of the present disclosure. Hereinafter, the wireless power transmitting device performing a particular operation means that a processor of the wireless power transmitting device is performing a particular operation or the processor is controlling other hardware units to perform a particular operation. Further, the wireless power transmitting device storing particular information may mean that a memory in the wireless power transmitting device is storing particular information.

A first wireless power transmitting device 401 transmits power within a power boundary 501 and conducts communication within a communication boundary 502. A second wireless power transmitting device 402 transmits power within a power boundary 511 and conducts communication within a communication boundary 512.

In step 410, the first wireless power transmitting device 401 determines a direction 521 in which an electronic device 403 is positioned. The first wireless power transmitting device 401 may determine the direction 521 in which the electronic device 403 is positioned using a communication signal received from, for example, the electronic device 403. The times of reception of the communication signal from the electronic device 403 by a plurality of communication antennas of the first wireless power transmitting device 401 may differ from one another. The first wireless power transmitting device 401 may determine the direction 521 in which the electronic device 403 is positioned based on differences in times of reception by the plurality of communication antennas. This is described in greater detail below with reference to FIG. 6.

In step 420, the first wireless power transmitting device 401 transmits an RF wave to the electronic device 403 based on the direction 521 in which the electronic device 403 is positioned to carry out wireless charging. For example, the first wireless power transmitting device 401 may determine the distance to the electronic device 403 to perform wireless charging. The first wireless power transmitting device 401 may instead form RF waves for detection multiple times, receive, as a feedback, received power-related information from the electronic device 403, and conduct wireless charging in a manner to form an optimal RF wave depending on the result of the feedback.

In step 430, the first wireless power transmitting device 401 sends the direction 521 in which the electronic device 403 is positioned to a second wireless power transmitting device 402. In step 440, the second wireless power transmitting device 402 transmits an RF wave to the electronic device 403 to perform wireless charging using the received direction 521 in which the electronic device 403 is positioned and relative positions of the first wireless power transmitting device 401 and the second wireless power transmitting device 402. The second wireless power transmitting device 402 may previously store a relative position 522 (i.e., topology) between the first wireless power transmitting device 401 and the second wireless power transmitting device 402. The second wireless power transmitting device 402 may determine the direction 523 of the electronic device 403 based on the received direction 521 and the previously stored relative position 522. The second wireless power transmitting device 402 may conduct wireless charging based on the direction 523 of the electronic device 403. For example, the second wireless power transmitting device 402 may also determine the distance to the electronic device 403 to perform wireless charging. The second wireless power transmitting device 402 may instead form RF waves for detection multiple times, receive, as a feedback, received power-related information from the electronic device 403, and conduct wireless charging in a manner to form an optimal RF wave depending on the result of the feedback.

Figure 6:
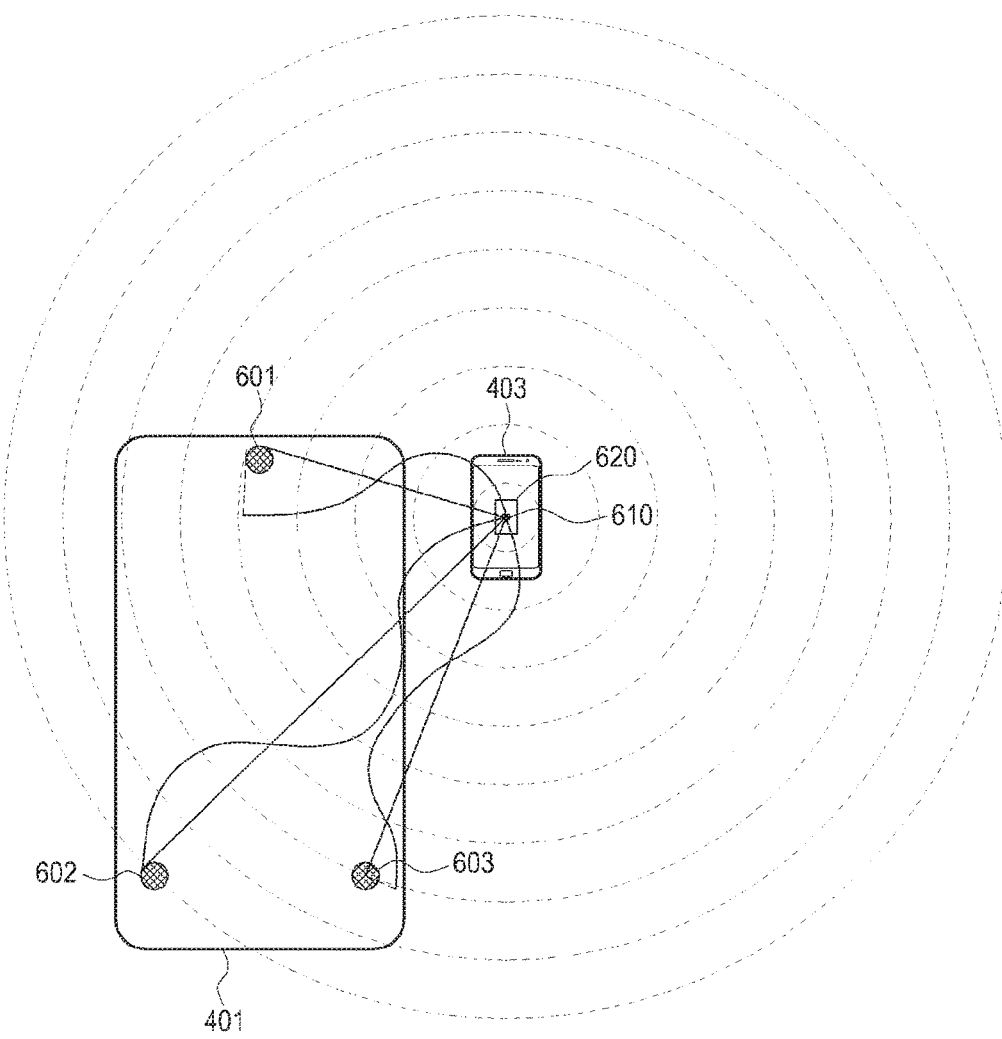
FIG. 6 is a diagram illustrating a process for determining the position of an electronic device by a wireless power transmitting device, according to an embodiment of the present disclosure.

FIG. 6 is a diagram illustrating a process for determining the position of an electronic device by a wireless power transmitting device, according to an embodiment of the present disclosure.

As illustrated in FIG. 6, the electronic device 403 may be positioned at a first point 610. The electronic device 403 may generate a communication signal that may propagate in space in the form of spherical waves. The spherical waves propagate from the first point 610. The first point 610 may be the point where the communication antenna 620 is positioned. Accordingly, the time when the communication signal is received by a first communication antenna 601, the time when the communication signal is received by a second communication antenna 602, and the time when the communication signal is received by a third communication antenna 603 may differ. For example, the first communication antenna 601 closest to the first point 610 may first receive the communication signal, the second communication antenna 602 may next receive the communication signal next, and the third communication antenna 603 may last receive the communication signal. FIG. 6 shows an example, and although the communication signal has a directional waveform, the times of reception by the communication antennas 601, 602, and 603 may be different. According to an embodiment of the present disclosure, the wireless power transmitting device 401 may include three or more communication antennas for the purpose of determining the direction of reception of the communication signal in a 3D space.

The processor of the wireless power transmitting device 401 may determine a direction of the electronic device 403 relative to the wireless power transmitting device 401 using the times of reception (e.g., t1, t2, and t3) of the communication signal by the communication antennas 601, 602, and 603. For example, the processor may determine a direction of the electronic device 403 relative to the wireless power transmitting device 401 using information about time differences t1-t2, t2-t3, and t3-t1. For example, as t1-t2 becomes closer to 0, the electronic device 403 may be determined to be more likely to be positioned on the line perpendicularly passing through the center of the line connecting the first communication antenna 601 with the second communication antenna 602. Further, as t1-t2 is a relatively larger positive value, the electronic device 403 may be determined to be more likely to be positioned closer to the second communication antenna 602. Further, as t1-t2 is a relatively larger negative value, the electronic device 403 may be determined to be more likely to be positioned closer to the first communication antenna 601. The wireless power transmitting device 401 may determine the 3D direction of the electronic device 403 relative to the wireless power transmitting device 401 by considering all of t1-t2, t2-t3, and t3-t1. The processor may determine a relative direction of the electronic device 403 using a program or algorithm capable of determining a direction and stored in, for example, the memory. The processor may also determine a relative direction of the electronic device 403 using a lookup table between the direction of the electronic device and the difference in reception time per communication antenna, which is stored in, for example, the memory. The wireless power transmitting device 401 (or the processor) may determine a relative direction of the electronic device 403 in various manners. For example, the wireless power transmitting device 300 (or the processor 320) may determine a relative direction of the electronic device 350 in various ways, such as DOA or FDOA, and the program or algorithm for determining the direction of received signal is not limited in type.

A method for wirelessly charging an electronic device after a direction of the electronic device is determined is described in greater detail below with reference to FIGS. 7 to 9.

Figure 7:
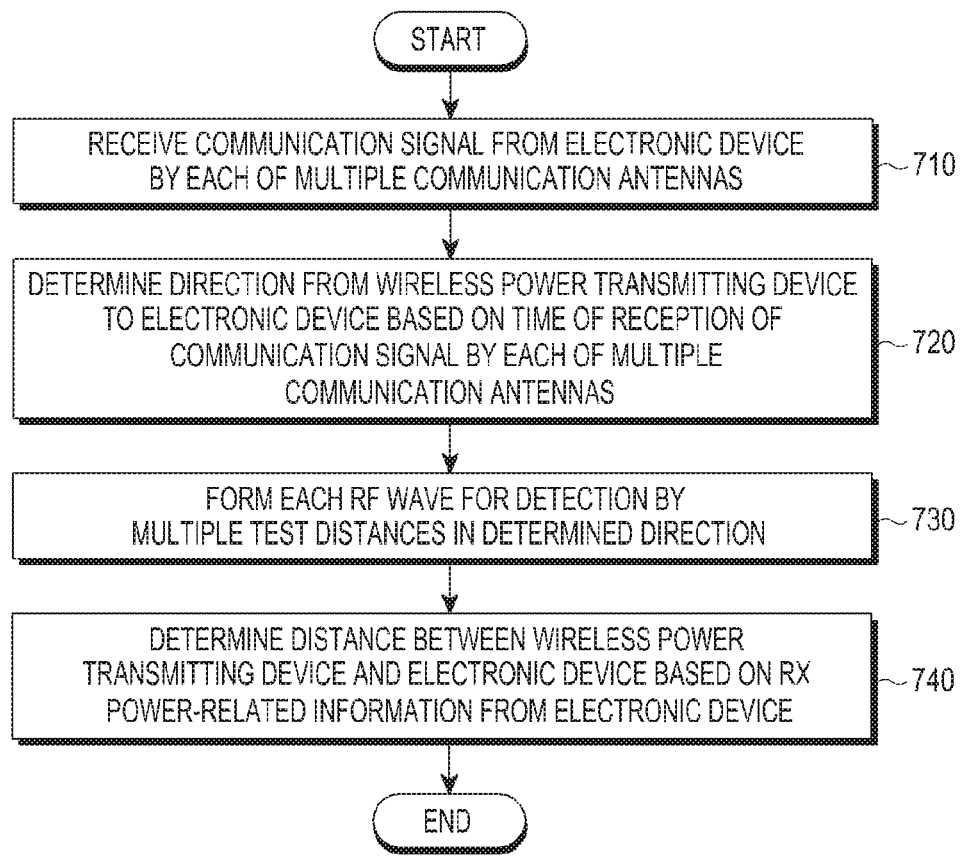
FIG. 7 is a flowchart illustrating a method for controlling a wireless power transmitting device, according to an embodiment of the present disclosure.

FIG. 7 is a flowchart illustrating a method for controlling a wireless power transmitting device, according to an embodiment of the present disclosure.

In step 710, a wireless power transmitting device (or a processor) receives a communication signal from an electronic device through each of a plurality of communication antennas. In step 720, the wireless power transmitting device determines the direction from the wireless power transmitting device to the electronic device based on the time of reception of the communication signal by each of the plurality of communication antennas. The wireless power transmitting device may determine the direction from the wireless power transmitting device to the electronic device using a difference in time of reception of the communication signal by each of the plurality of communication antennas.

In step 730, the wireless power transmitting device (or a plurality of antenna patches) forms an RF wave for detection corresponding to each of a plurality of test distances in the determined direction.

In step 740, the wireless power transmitting device determines the distance between the wireless power transmitting device and the electronic device based on the received power-related information from the electronic device. Specifically, the wireless power transmitting device may provide a first magnitude of power to the plurality of patch antennas. The RF wave may be formed to have a first distance in which case the wireless power transmitting device may receive received power-related information (e.g., voltage at the output end of the rectifier of the electronic device) from the electronic device. Further, the wireless power transmitting device may provide a second magnitude of power to the plurality of patch antennas. The RF wave may be formed to have a second distance in which case the wireless power transmitting device may receive received power-related information (e.g., voltage at the output end of the rectifier of the electronic device) from the electronic device. Varying the distance of formation of the RF wave may mean that the wireless power transmitting device may vary the point where the sub-RF waves constructively interfere with one another. For example, the distance of formation of the RF wave may be varied by changing the magnitude of power applied to the patch antennas.

For example, when the electronic device is positioned away from the wireless power transmitting device by a second distance, a relatively large magnitude of power may be received where the wireless power transmitting device forms a second distance of the RF wave. Accordingly, the voltage at the output end of the electronic device may have a relatively large value. The wireless power transmitting device may determine that the electronic device is positioned away from the wireless power transmitting device by the second distance, based on the received power-related information (e.g., the voltage at the output end of the rectifier) from the electronic device.

The wireless power transmitting device may determine the position of the electronic device by determining the distance from the wireless power transmitting device and the direction of the electronic device. The wireless power transmitting device may control each of the plurality of patch antennas so that the sub-RF waves may constructively interfere with one another at the position of the electronic device.

Figure 8:
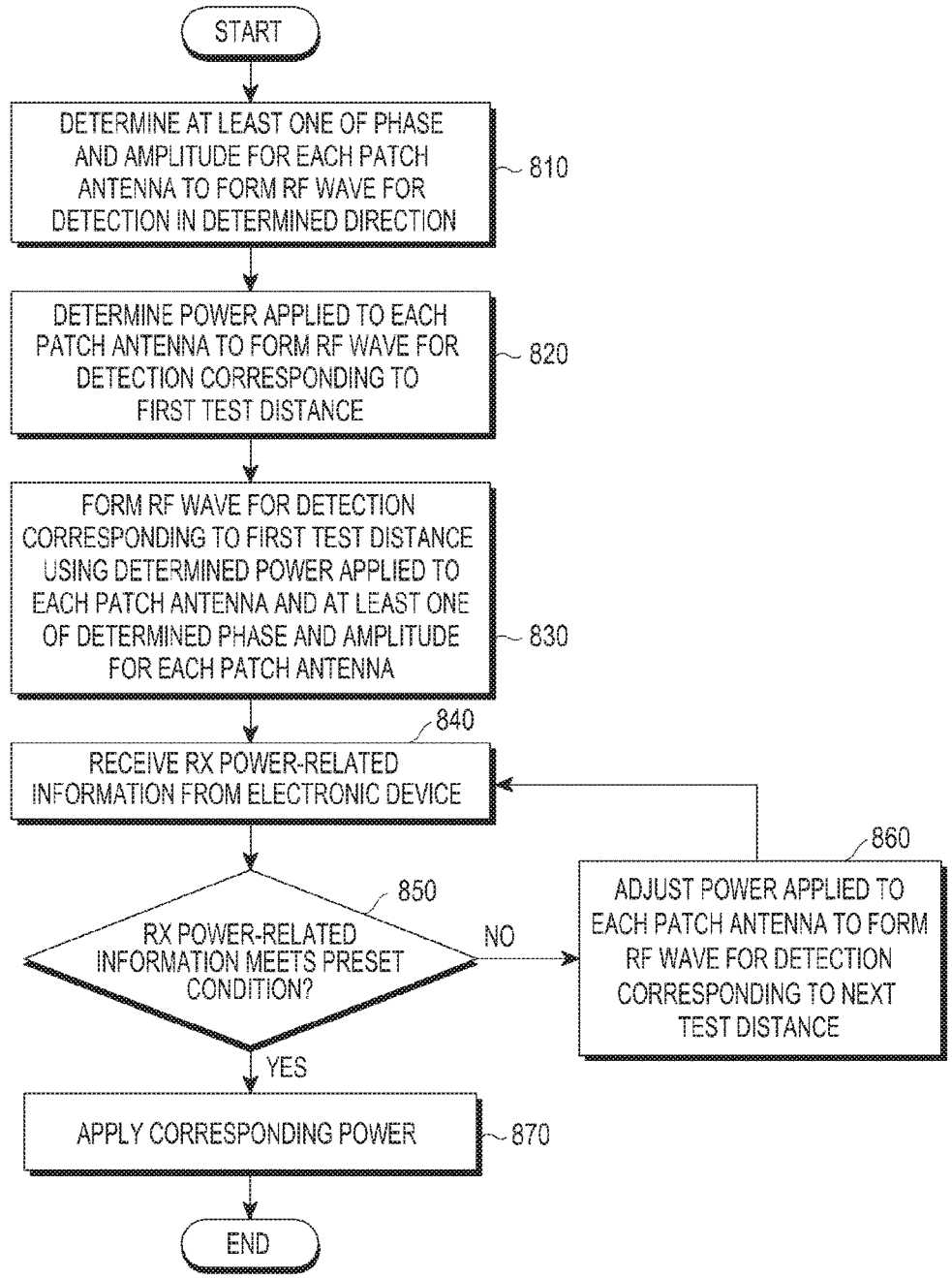
FIG. 8 is a flowchart illustrating a method for controlling a wireless power transmitting device, according to an embodiment of the present disclosure.
Figure 9:
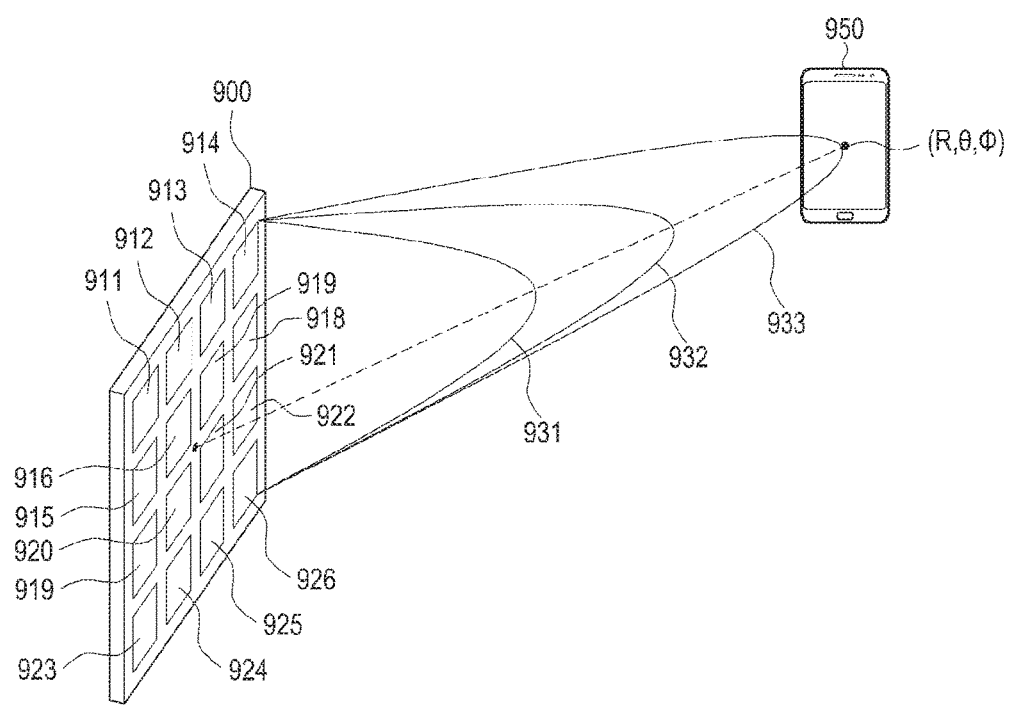
FIG. 9 is a diagram illustrating a configuration for determining the distance between a wireless power transmitting device and an electronic device, according to an embodiment of the present disclosure.

FIG. 8 is a flowchart illustrating a method for controlling a wireless power transmitting device according to an embodiment of the present disclosure. The embodiment shown in FIG. 8 is described in greater detail with reference to FIG. 9. FIG. 9 is a diagram illustrating a configuration for determining the distance between a wireless power transmitting device and an electronic device, according to an embodiment of the present disclosure.

In step 810, a wireless power transmitting device 900 determines at least one of the phase and amplitude for each patch antenna 911 to 926 to form an RF wave for detection in a determined direction (θ,φ). For example, upon determining that an electronic device 950 is positioned relatively at a right side of the wireless power transmitting device 900, the wireless power transmitting device 900 may apply a relatively large delay to patch antennas positioned relatively at a right side so that the sub-RF waves respectively generated from the plurality of patch antennas 911 to 926 may constructively interfere with one another relatively at a right side. Also, upon determining that the electronic device 950 is positioned relatively at an upper side of the wireless power transmitting device 900, the wireless power transmitting device 900 may apply a relatively large delay to patch antennas positioned relatively at an upper side so that the sub-RF waves respectively generated from the plurality of patch antennas 911 to 926 may constructively interfere with one another relatively at an upper side. The wireless power transmitting device 900 may apply different delays to the patch antennas 911 to 926, respectively, arranged in two-dimension (2D), allowing the RF wave generated by each of the patch antennas 911 to 926 to have a different phase.

In step 820, the wireless power transmitting device 900 determines the magnitude of power applied to each patch antenna 911 to 926 so that an RF wave 931 for detection is formed corresponding to a first test distance. According to an embodiment of the present disclosure, the wireless power transmitting device 900 may directly determine the magnitude of first test power provided to the plurality of patch antennas 911 to 926 without determining distance. Here, the first test distance or the magnitude of the first test power may have a default value.

In step 830, the wireless power transmitting device 900 forms the RF wave 931 corresponding to the first test distance using the determined power applied to each patch antenna 911 to 926 and at least one of the determined phase and amplitude for each patch antenna 911 to 926.

In step 840, the wireless power transmitting device 900 receives received power-related information from the electronic device 950. In step 850, the wireless power transmitting device 900 determines whether the received power-related information meets a preset condition. For example, the wireless power transmitting device 900 may determine whether the voltage at the output end of the rectifier of the electronic device 950, which is the received power-related information, exceeds a preset threshold voltage. For example, the wireless power transmitting device 900 may determine whether the current at the output end of the rectifier of the electronic device 950, which is the received power-related information, exceeds a preset threshold current. In another example, the wireless power transmitting device 900 may determine whether the power at the output end of the rectifier of the electronic device 950, which is the received power-related information, exceeds a preset threshold power.

When the received power-related information fails to meet the preset condition, the wireless power transmitting device 900 adjusts the power applied to each patch antenna 911 to 926 to form an RF wave 932 for detection corresponding to a next test distance, in step 860. The wireless power transmitting device 900 may determine the magnitude of a next test power immediately without determining a test distance and apply the same to each patch antenna 911 to 926. Although FIG. 9 illustrates that the wireless power transmitting device 900 increases the test distance, this is merely an example, and the wireless power transmitting device 900 may also reduce the test distance. Meanwhile, the wireless power transmitting device 900 may adjust the magnitude of power applied to each patch antenna 911 to 926 until the received power-related information meets the preset condition.

When the received power-related information meets the preset condition, the wireless power transmitting device 900 maintains the power applied to each patch antenna to send out a RF wave and perform wireless charging, in step 870. As shown in FIG. 9, when an RF wave 933 is formed to have a third test distance, the received power-related information may be determined to be met. The wireless power transmitting device 900 may maintain the magnitude of power applied to each patch antenna 911 to 926 so as to maintain the formation of the RF wave 933 in the third test distance. The wireless power transmitting device 900 may determine that the distance to the electronic device 950 is the third test distance R or may control only power applied to each patch antenna 911 to 926 without determination as to the distance to the electronic device 950.

As described above, the wireless power transmitting device 900 may determine the distance to the electronic device 950 and may control the patch antennas so that the sub-RF waves constructively interfere with one another at a corresponding point, allowing for wireless transmission at a relatively high transmission efficiency.

According to an embodiment of the present disclosure, the wireless power transmitting device 900 may receive the direction of the electronic device 950 from another wireless power transmitting device. The wireless power transmitting device 900 may also determine the direction of the electronic device 950 from the wireless power transmitting device 900 using the received direction and the position of the wireless power transmitting device 900 and the other wireless power transmitting device. The wireless power transmitting device 900 may charge the electronic device 950 in such a manner as to generate a RF wave for test and receive a feedback using the determined direction as set forth above.

Figure 10:
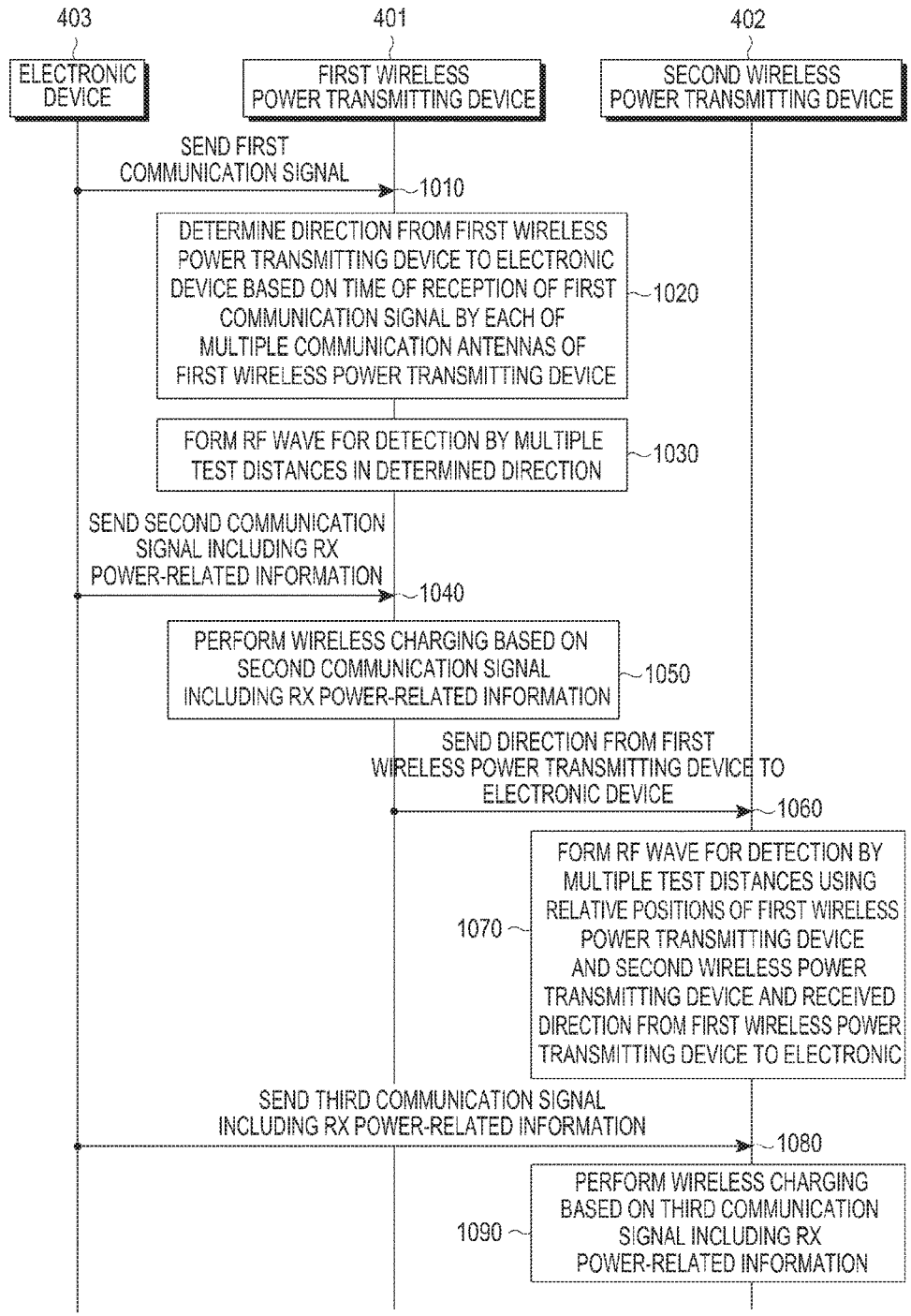
FIG. 10 is a flowchart illustrating a method for controlling wireless power transmitting devices, according to an embodiment of the present disclosure.

FIG. 10 is a flowchart illustrating a method for controlling wireless power transmitting devices, according to an embodiment of the present disclosure.

In step 1010, an electronic device 403 sends out a first communication signal. In step 1020, the first wireless power transmitting device 401 determines a direction from the first wireless power transmitting device 401 to the electronic device 403 based on a time of reception of a first communication signal by each of a plurality of communication antennas of the first wireless power transmitting device 401.

In step 1030, the first wireless power transmitting device 401 forms RF waves by a plurality of test distances in the determined direction. In step 1040, the electronic device 403 sends a second communication signal including received power-related information to the first wireless power transmitting device 401. In step 1050, the first wireless power transmitting device 401 performs wireless charging based on the second communication signal including the received power-related information. Specifically, the first wireless power transmitting device 401 may vary the magnitude of the RF wave until the received power-related information meets a preset condition. When the received power-related information meets the preset condition, the first wireless power transmitting device 401 may charge the electronic device 403 by maintaining the application of the RF wave.

In step 1060, the first wireless power transmitting device 401 sends out the direction from the first wireless power transmitting device 401 to the electronic device 403, to the second wireless power transmitting device 402. In an environment where three or more wireless power transmitting devices are arranged, the first wireless power transmitting device 401 may share the direction to the electronic device 403 with all other wireless power transmitting devices.

In step 1070, the second wireless power transmitting device 402 forms RF waves for detection by a plurality of test distances using the received direction from the first wireless power transmitting device 401 to the electronic device 403 and relative positions of the first wireless power transmitting device 401 and the second wireless power transmitting device 402. For example, the second wireless power transmitting device 402 may determine the direction from the second wireless power transmitting device 402 to the electronic device 403 using the direction from the first wireless power transmitting device 401 to the electronic device 403 and the relative positions of the first wireless power transmitting device 401 and the second wireless power transmitting device 402. The second wireless power transmitting device 403 may form the RF wave for detection in the direction from the second wireless power transmitting device 402 to the electronic device 403 while varying the magnitude of the RF wave until the received power-related information meets the preset condition.

In step 1080, the second wireless power transmitting device 402 sends out a third communication signal including received power-related information. In step 1090, the second wireless power transmitting device 402 performs wireless charging based on the third communication signal including the received power-related information. The second wireless power transmitting device 402, together with the first wireless power transmitting device 401, may charge the electronic device 403, or the first wireless power transmitting device 401 may stop charging the electronic device 403 while the second wireless power transmitting device 402 alone may charge the electronic device 403.

Figure 11:
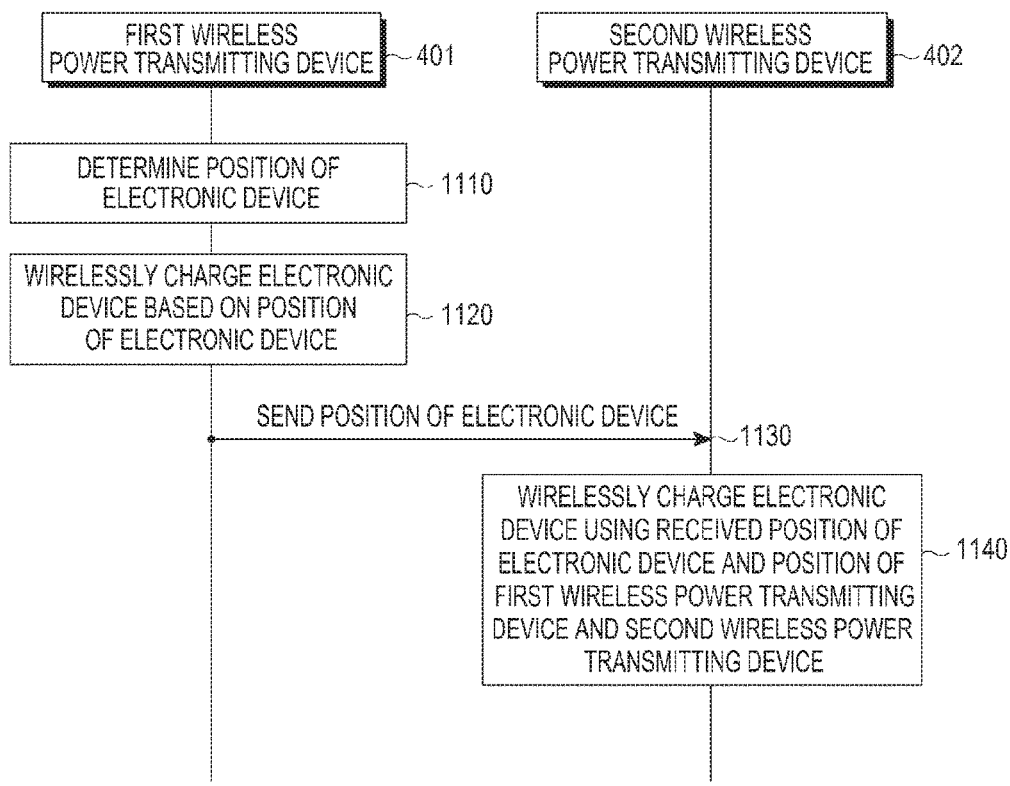
FIG. 11 is a flowchart illustrating a method for controlling a wireless power transmitting device, according to an embodiment of the present disclosure.
Figure 12:
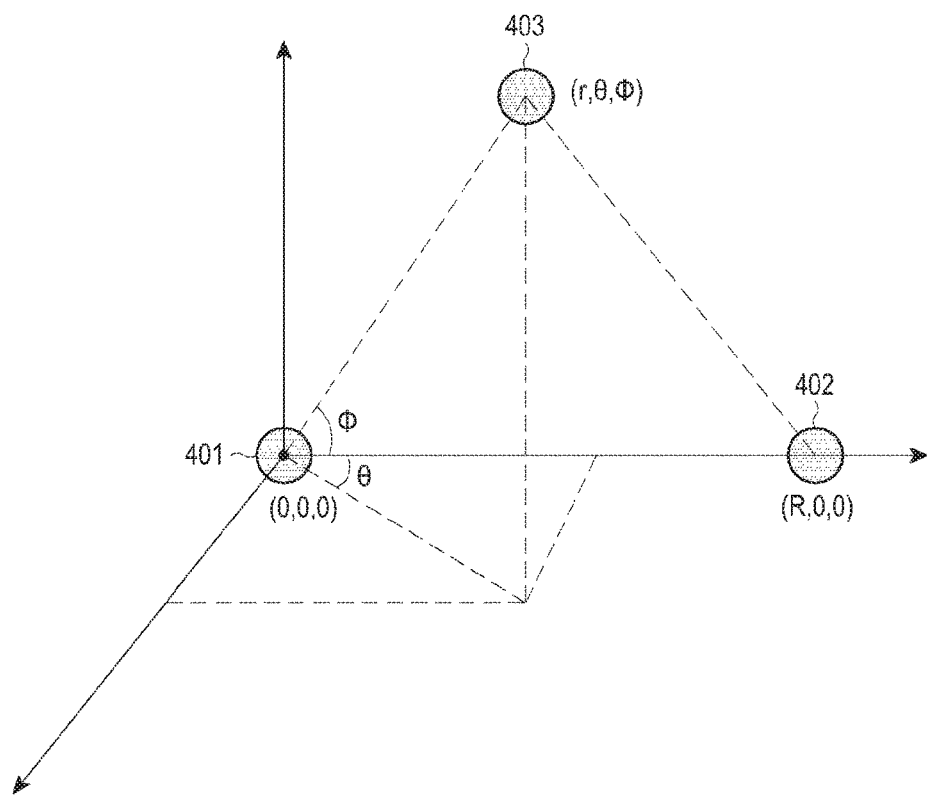
FIG. 12 is a diagram illustrating an arrangement of a wireless power transmitting device and an electronic device, according to an embodiment of the present disclosure.

FIG. 11 is a flowchart illustrating a method for controlling a wireless power transmitting device, according to an embodiment of the present disclosure. The embodiment related to FIG. 11 is described in greater detail with reference to FIG. 12. FIG. 12 is a diagram illustrating an arrangement of a wireless power transmitting device and an electronic device, according to an embodiment of the present disclosure.

In step 1110, the first wireless power transmitting device 401 determines the position of the electronic device 403. For example, the first wireless power transmitting device 401 may determine the direction of the electronic device 403 according to a time of reception of a communication signal by each of a plurality of communication antennas, as set forth above. Further, the first wireless power transmitting device 401 may determine the distance to the electronic device 403. As described above, the first wireless power transmitting device 401 may determine the distance to the electronic device 403 based on application of an RF wave for detection and information fed back, or the first wireless power transmitting device 401 may also determine the distance to the electronic device 403 based on the strength of the communication signal from the electronic device 403. For example, the communication signal may include information about a strength at the time of transmission. The first wireless power transmitting device 401 may also determine the distance to the electronic device 403 by comparing the strength at the time of transmission, contained in the communication signal, with the strength of the communication signal received.

According to an embodiment of the present disclosure, the first wireless power transmitting device 401 may directly receive position information from the electronic device 403. The electronic device 403 may determine its position based on various indoor positioning schemes. For example, the electronic device 403 may acquire an indoor geo-magnetic map and compare data sensed by a geo-magnetic sensor with the acquired geo-magnetic map. The electronic device 403 may determine the indoor position of the electronic device 403 based on the result of comparison. The electronic device 403 may instead determine the indoor position of the electronic device 403 based on a Wi-Fi signal-based indoor positioning scheme. When the electronic device 403 is positioned outdoors, the electronic device 403 may instead determine its position using a GPS module.

The electronic device 403 may include information about the determined position in a communication signal and send out the communication signal, and the first wireless power transmitting device 401 may identify the position of the electronic device 403 using the communication signal. For example, the first wireless power transmitting device 401 may determine that the electronic device 403 is positioned at $(r,\theta,\varphi)$ as illustrated in FIG. 12. Although the coordinates of the electronic device 403 are shown to be in a spherical coordinate system in the embodiment of FIG. 12, this is merely an example, and the type of coordinates indicating the position of the electronic device 403 is not limited thereto. Further, although the coordinates of the electronic device 403 are shown to have been set with respect to the first wireless power transmitting device, as the origin, in the embodiment of FIG. 12, this is an example. The coordinates of the electronic device 403 may also be set with respect to another point, not the first wireless power transmitting device 401, as the origin. Specifically, according to an embodiment of the present disclosure, a relative coordinate system taking the first wireless power transmitting device 401 as the origin may be used, or an absolute coordinate system for a particular region may be used as well.

In step 1120, the first wireless power transmitting device 401 wirelessly charges the electronic device 403 based on the position of the electronic device 403. The first wireless power transmitting device 401 may control at least one of the phase and amplitude of each patch antenna so that sub-RF waves may constructively interfere with one another at the position of the electronic device 403.

In step 1130, the first wireless power transmitting device 401 sends the position of the electronic device 403 to a second wireless power transmitting device 402.

In step 1140, the second wireless power transmitting device 402 wirelessly charges the electronic device 403 using the received position of the electronic device 403 and the position of the first wireless power transmitting device 401 and the second wireless power transmitting device 402. The second wireless power transmitting device 402 may convert the received position, (r,θ,φ), of the electronic device 403 into relative coordinates taking the second wireless power transmitting device 402 as the origin, considering the relative coordinates (R,0,0) for the first wireless power transmitting device 401. The second wireless power transmitting device 402 may control at least one of the phase and amplitude of each patch antenna so that sub-RF waves may internal coverage at the converted relative coordinates.

According to an embodiment of the present disclosure, the second wireless power transmitting device 402 may receive the absolute coordinates of the electronic device 403. In this case, the second wireless power transmitting device 402 may control at least one of the phase and amplitude of each patch antenna so that sub-RF waves may internal coverage at the absolute coordinates of the electronic device 403 without other separate conversion processes.

Figure 13:
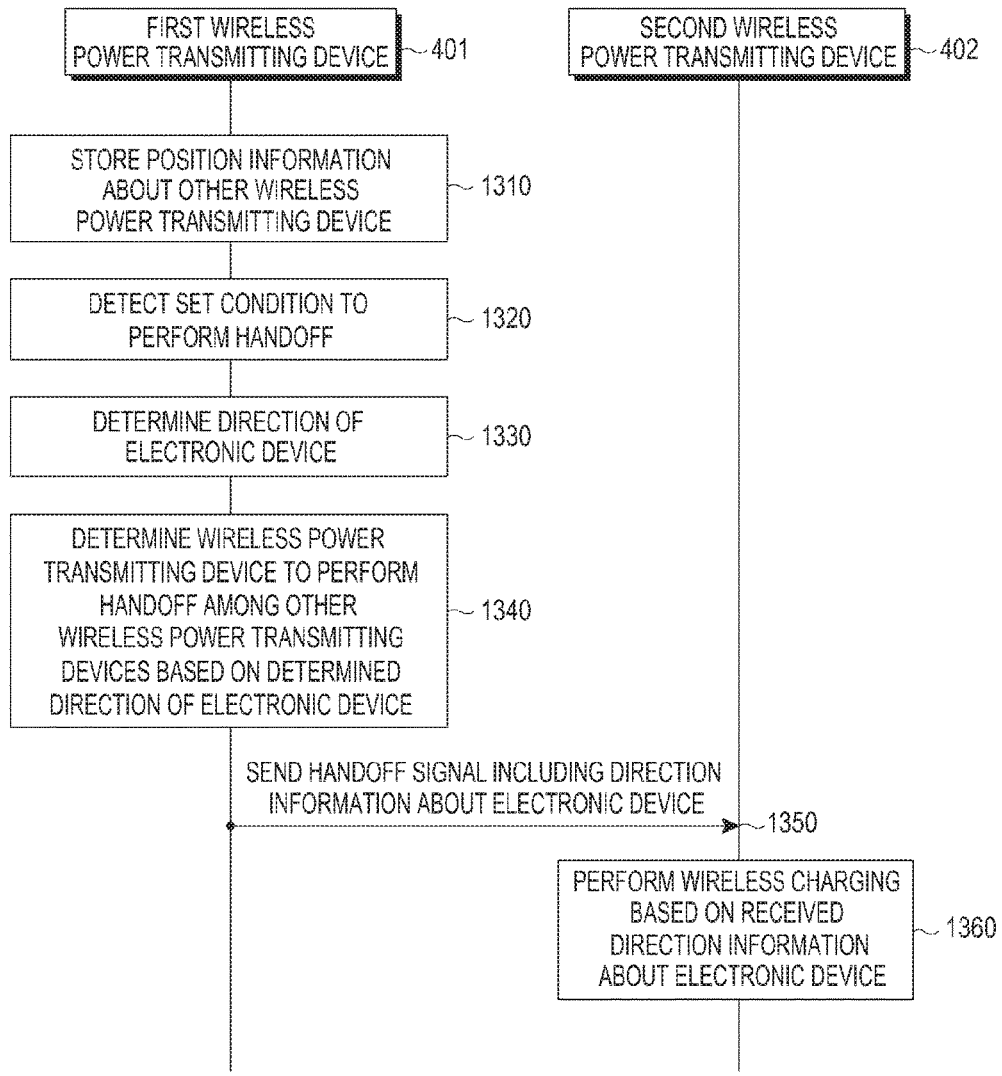
FIG. 13 is a flowchart illustrating a method for controlling a wireless power transmitting device, according to an embodiment of the present disclosure.
Figure 14:
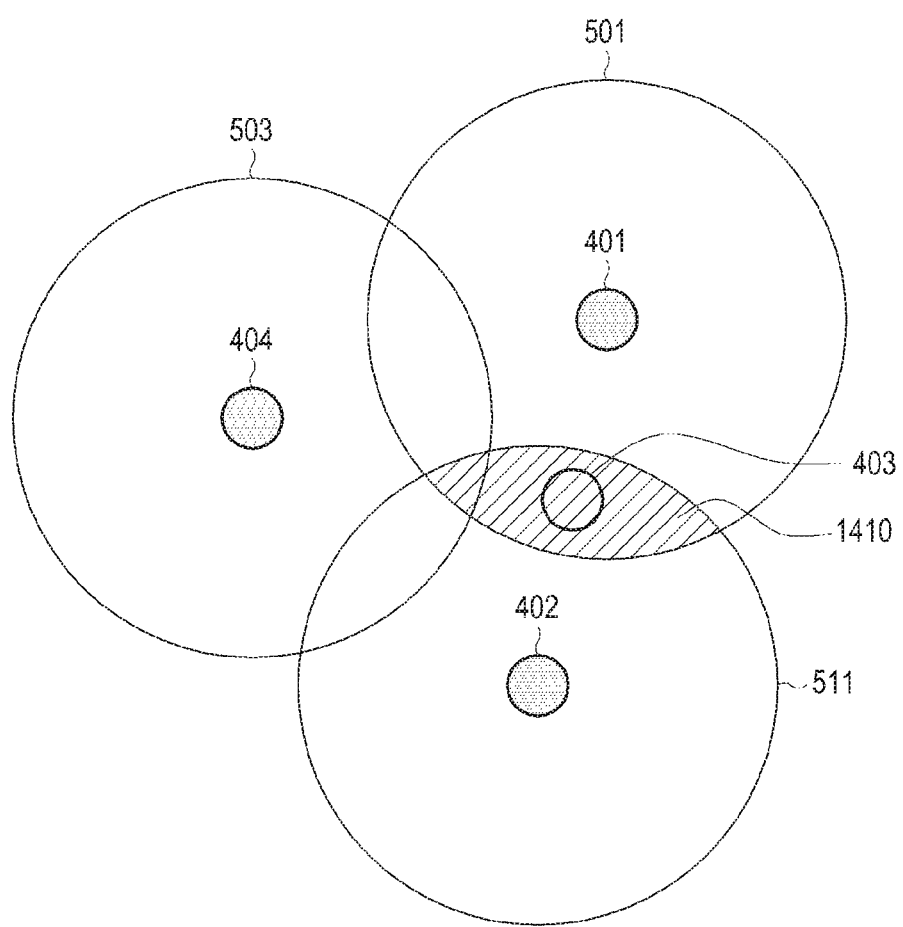
FIG. 14 is a diagram illustrating a handoff of a wireless power transmitting device, according to an embodiment of the present disclosure.

FIG. 13 is a flowchart illustrating a method for controlling a wireless power transmitting device, according to an embodiment of the present disclosure. The embodiment related to FIG. 13 is described in greater detail with reference to FIG. 14. FIG. 14 is a diagram illustrating a handoff of a wireless power transmitting device, according to an embodiment of the present disclosure. The first wireless power transmitting device 401, the second wireless power transmitting device 402, and a third wireless power transmitting device 404, respectively, may transmit power within the first power boundary 501, the second power boundary 511, and a third power boundary 503. The wireless power transmitting devices 401, 402, and 403 may be arranged so that the first power boundary 501, the second power boundary 511, and the third power boundary 503 partially overlap each other. Specifically, the wireless power transmitting devices 401, 402, and 404 may be arranged so that no shadow area for wireless charging is formed in a particular region.

In step 1310, the first wireless power transmitting device 401 stores information about the position of the other wireless power transmitting devices. For example, the first wireless power transmitting device 401 may store the position of each of the second wireless power transmitting device 402 and the third wireless power transmitting device 404 of FIG. 14. The first wireless power transmitting device 401 may previously measure the position of each of the second wireless power transmitting device 402 and the third wireless power transmitting device 404 and store the measured position. When the position of the second wireless power transmitting device 402 and the third wireless power transmitting device 404 varies, the first wireless power transmitting device 401 may update and store the varied position.

In step 1320, the first wireless power transmitting device 401 detects a condition set to perform a handoff. The condition set to perform a handoff may be the one that received power-related information from an electronic device meets a preset handoff condition (e.g., the voltage at the output end of a rectifier in the electronic device being less than a preset threshold voltage), which is described in greater detail below with reference to FIGS. 16 and 17.

In step 1330, the first wireless power transmitting device 401 determines the direction of the electronic device 403. In step 1340, the first wireless power transmitting device 401 determines a wireless power transmitting device with which to perform a handoff among the other wireless power transmitting devices based on the determined direction of the electronic device 403. For example, in the embodiment of FIG. 14, the first wireless power transmitting device 401 may determine that the second wireless power transmitting device 402 is associated with the direction of the electronic device 403, and accordingly, the first wireless power transmitting device 401 may determine that the second wireless power transmitting device 402 is a wireless power transmitting device with which to perform a handoff for the electronic device 403.

In step 1350, the first wireless power transmitting device 401 sends out a handoff signal including information about the direction of the electronic device 403 to the second wireless power transmitting device 402. In step 1360, the second wireless power transmitting device 402 performs wireless charging based on the received direction information of the electronic device 403. As described above, the second wireless power transmitting device 402 may determine the direction of the electronic device 403 with respect to the second wireless power transmitting device 402 using the received direction of the electronic device 403. The second wireless power transmitting device 402 may form an RF wave for detection in the direction of the electronic device 403 with respect to the second wireless power transmitting device 402 and may perform wireless charging using feedback information received corresponding thereto. Accordingly, a handoff may be performed in an area 1410 where the wireless power transmitting devices 401 and 402 both are able to wirelessly transmit power. In particular, as the time required for the second wireless power transmitting device 402 to grasp the position of the electronic device 403 is reduced by the above method, seamless wireless charging may be possible.

Figure 15A:
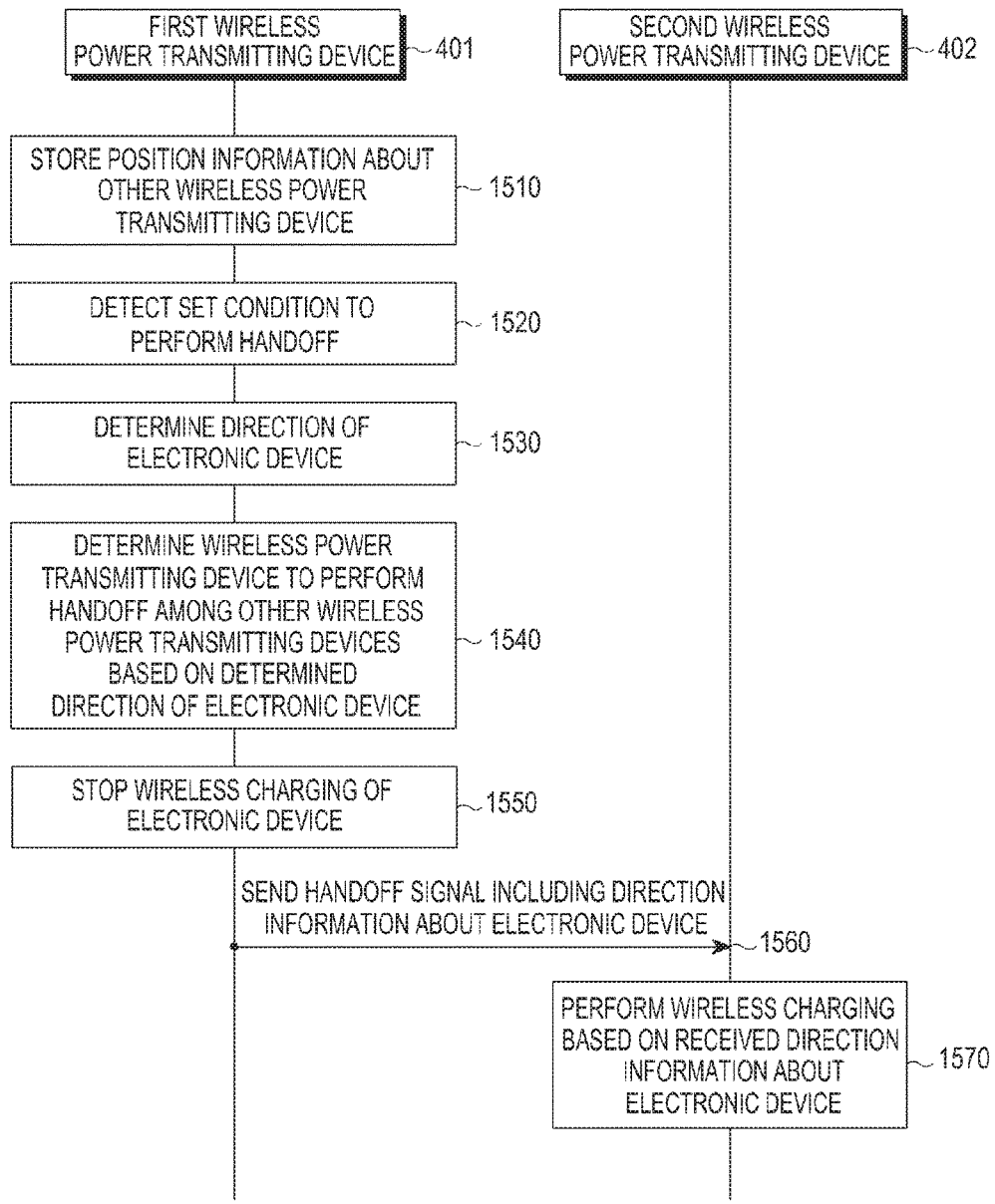
FIGS. 15A and 15B are flowcharts illustrating a handoff process, according to an embodiment of the present disclosure.
Figure 15B:
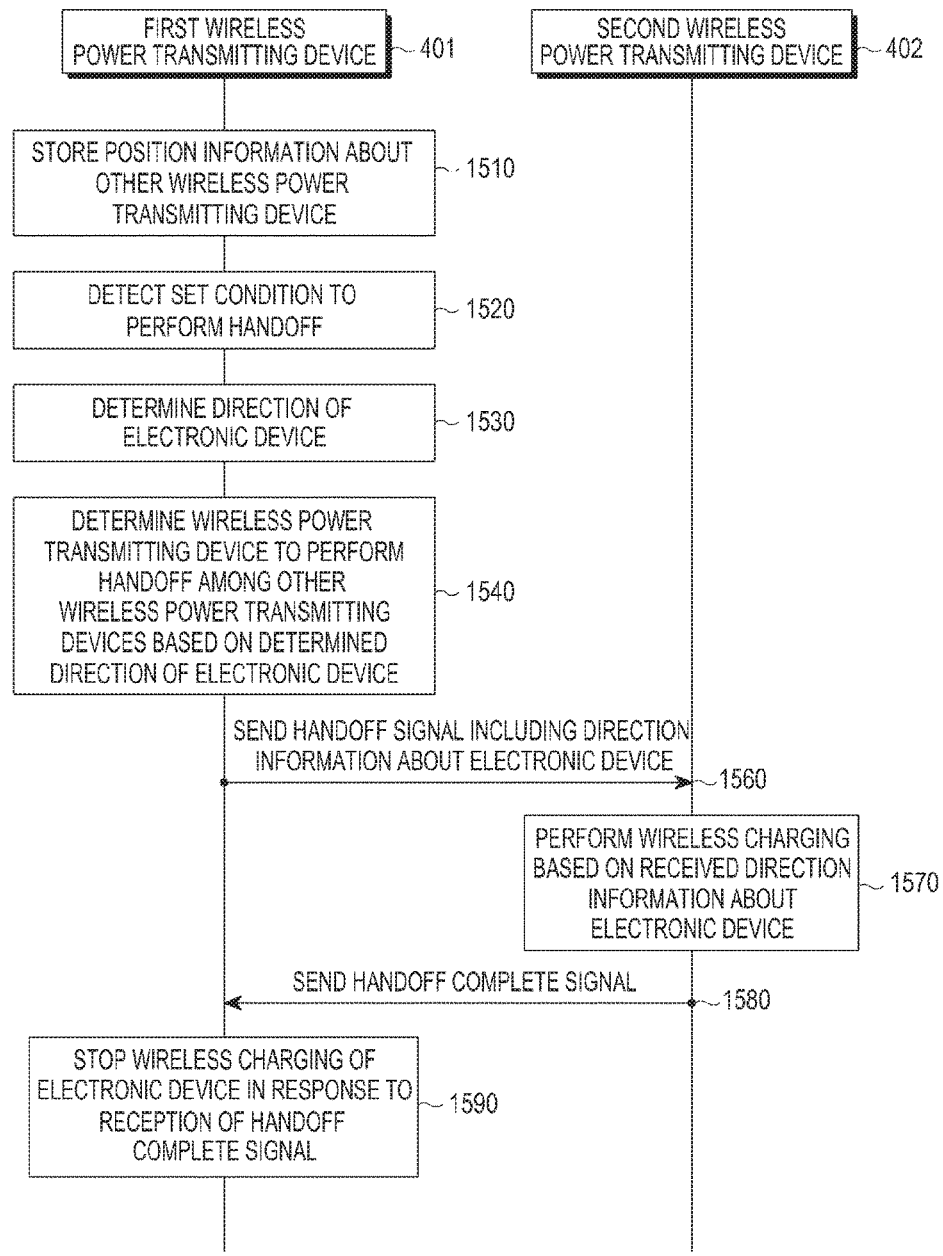

FIGS. 15A and 15B are flowcharts illustrating a handoff process, according to an embodiment of the present disclosure.

In step 1510, the first wireless power transmitting device 401 stores information about the position of the other wireless power transmitting devices. In step 1520, the first wireless power transmitting device 401 detects a condition set to perform a handoff. According to an embodiment of the present disclosure, the condition set to perform a handoff may be the one, for example, that the received power-related information of the electronic device 403, e.g., the voltage at the output end of the rectifier, drops to less than a threshold, which is described in greater detail below with reference to FIG. 16.

In step 1530, the first wireless power transmitting device 401 determines the direction of the electronic device. In step 1540, the first wireless power transmitting device 401 determines a wireless power transmitting device to perform a handoff among the other wireless power transmitting devices based on the determined direction of the electronic device. For example, in the embodiment of FIG. 14, the second wireless power transmitting device 402 may be determined to be the wireless power transmitting device to perform a handoff based on the second wireless power transmitting device 402 being positioned in the direction of the first wireless power transmitting device 401. According to an embodiment of the present disclosure, the first wireless power transmitting device 401 may compare a difference between the direction in which the second wireless power transmitting device 402 is positioned and the direction in which the electronic device 403 is positioned with a difference between the direction in which the third wireless power transmitting device 404 is positioned and the direction in which the electronic device 403 is positioned. The first wireless power transmitting device 401 may determine that the second wireless power transmitting device 402 is the wireless power transmitting device to perform a handoff based on the difference between the directions in which the second wireless power transmitting device 402 and the electronic device 403 are positioned being smaller than the difference between the directions in which the third wireless power transmitting device 404 and the electronic device 403 are positioned.

In step 1550, the first wireless power transmitting device 401 stops wirelessly charging the electronic device. In step 1560, the first wireless power transmitting device 401 sends out a handoff signal including information about the direction of the electronic device to the second wireless power transmitting device 402. In step 1570, the second wireless power transmitting device 402 performs wireless charging based on the received direction information of the electronic device. Thus, a hard handoff for wirelessly receiving power may be performed in the network constituted of the wireless power transmitting devices. In other words, the electronic device 403 cannot receive power during the handoff process.

FIG. 15B is a flowchart illustrating a soft handoff process, according to an embodiment of the present disclosure. Steps 1510 to 1570 have been described in detail above in connection with FIG. 15A. The first wireless power transmitting device 401 may maintain the wireless charging of the electronic device 403 at the time of transmission of a handoff signal, in step 1560. In step 1580, the second wireless power transmitting device 402 sends a handoff complete signal to the first wireless power transmitting device 401. For example, the second wireless power transmitting device 402 may complete a wireless charging-related procedure, such as recognizing the electronic device 403, determining whether to charge, and sending a charging authorize message to the electronic device 403, and send a handoff complete signal to the first wireless power transmitting device 401. In step 1590, the first wireless power transmitting device 401 stops the wireless charging of the electronic device 403 in response to the reception of the handoff complete signal. Specifically, the electronic device 403 may seamlessly receive power even during the handoff process.

Figure 16:
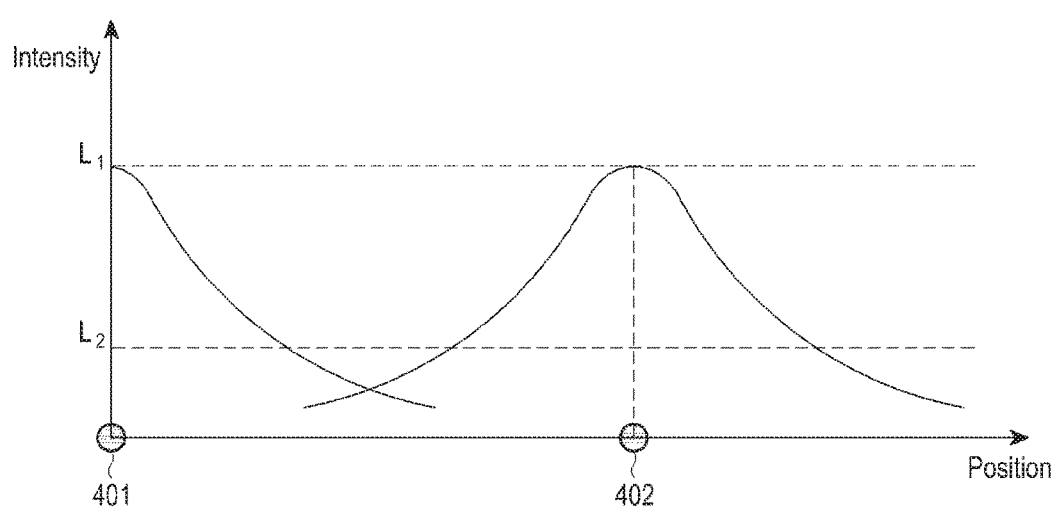
FIG. 16 is a diagram illustrating the strength of a RF wave according to distances.

FIG. 16 is a diagram illustrating the strength of a RF wave according to distances. For example, the first wireless power transmitting device 401 sends out an RF wave of a strength L1 at the time of transmission. Upon indicating the strength of the RF wave itself, the unit "decibels above 1 milli-watt (dBm)" may be available as well. Meanwhile, unit of RF wave measured by the electronic device receiving the RF wave is not limited as long as it indicates strength, such as power (W), voltage (V), or current (A). As illustrated in FIG. 16, the strength of the RF wave generated from the first wireless power transmitting device 401 is reduced by the distance. The strength L2 is a strength secured for the electronic device 403 to be subject to good wireless charging, and receiving a RF wave smaller than the corresponding strength may be interpreted as the electronic device 403 being incapable of wireless charging. Where the electronic device 403 receives a RF wave of the strength L2, the voltage at, at least, one point inside the electronic device 403, for example, the output end of the rectifier, may drop to less than a preset threshold. Upon receiving received power-related information, for example, a report indicating that the voltage at the output end of the rectifier drops to less than the preset threshold, from the electronic device 403, the first wireless power transmitting device 401 may determine that a handoff condition of the electronic device 403 is detected. When the distance to the electronic device 403 is in excess of a preset threshold, the first wireless power transmitting device 401 may determine that the handoff condition of the electronic device 403 is detected.

Figure 17:
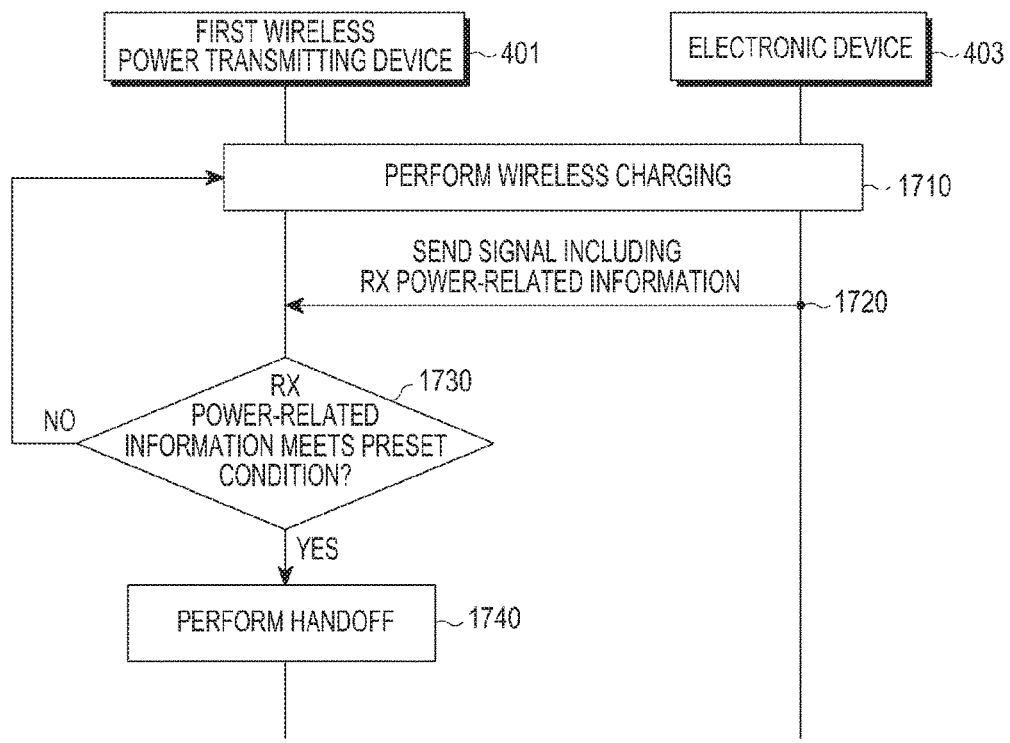
FIG. 17 is a flowchart illustrating operations of a wireless power transmitting device, according to an embodiment of the present disclosure.

FIG. 17 is a flowchart illustrating operations of a wireless power transmitting device, according to an embodiment of the present disclosure.

In step 1710, the first wireless power transmitting device 401 wirelessly charges the electronic device 403. In step 1720, the electronic device 403 sends out a signal including received power-related information. The received power-related information may be information about the voltage, current, or power at a point inside the electronic device 403 (e.g., information about the voltage, current, or power at the output end of the rectifier). In step 1730, the first wireless power transmitting device 401 determines whether the received power-related information meets a preset condition. For example, upon determining that the voltage at the output end of the rectifier in the electronic device 403 is less than a preset threshold, the first wireless power transmitting device 401 may determine that the handoff condition is met. In step 1740, the first wireless power transmitting device 401 conducts a handoff procedure.

Figure 18:
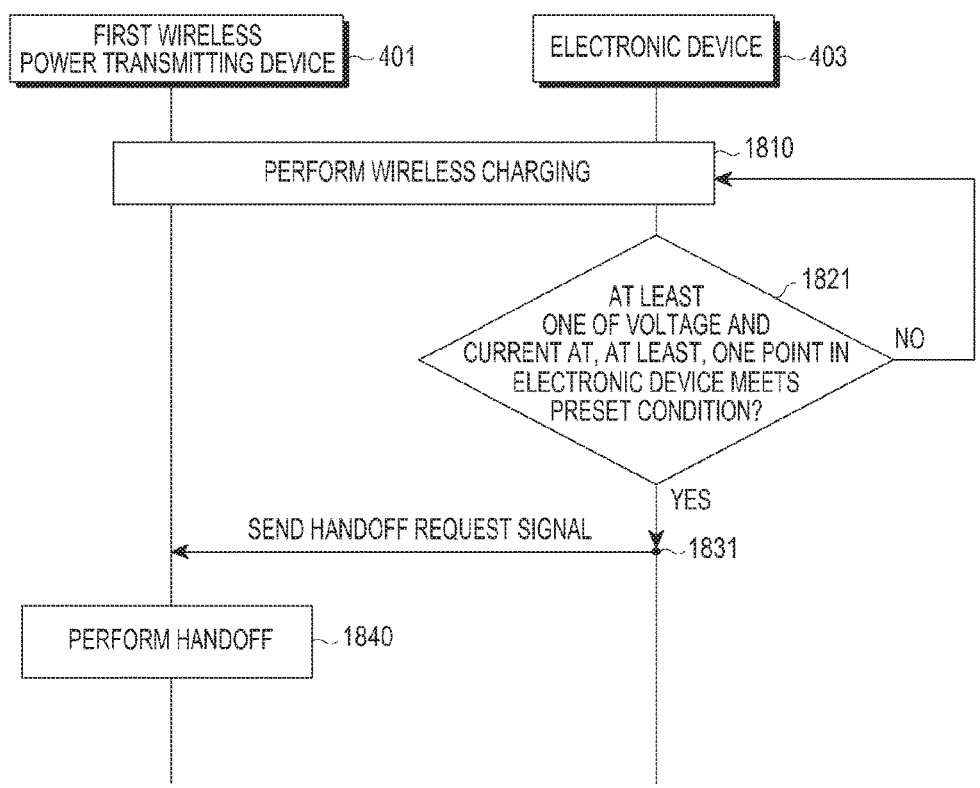
FIG. 18 is a flowchart illustrating a handoff process, according to an embodiment of the present disclosure.

FIG. 18 is a flowchart illustrating a handoff process, according to an embodiment of the present disclosure.

In step 1810, the first wireless power transmitting device 401 conducts wireless charging. In step 1821, the electronic device 403 determines whether at least one of the voltage and current at, at least, one point inside the electronic device 403 meets a preset condition. For example, upon determining that the voltage at the output end of the rectifier is less than a preset threshold, the electronic device 403 may determine that the handoff condition is met. In step 1831, the electronic device 403 sends out a handoff request signal. In step 1840, the first wireless power transmitting device 401 conducts a handoff procedure. Specifically, as shown in FIG. 18, the electronic device 403 may request and conduct a handoff.

Figure 19:
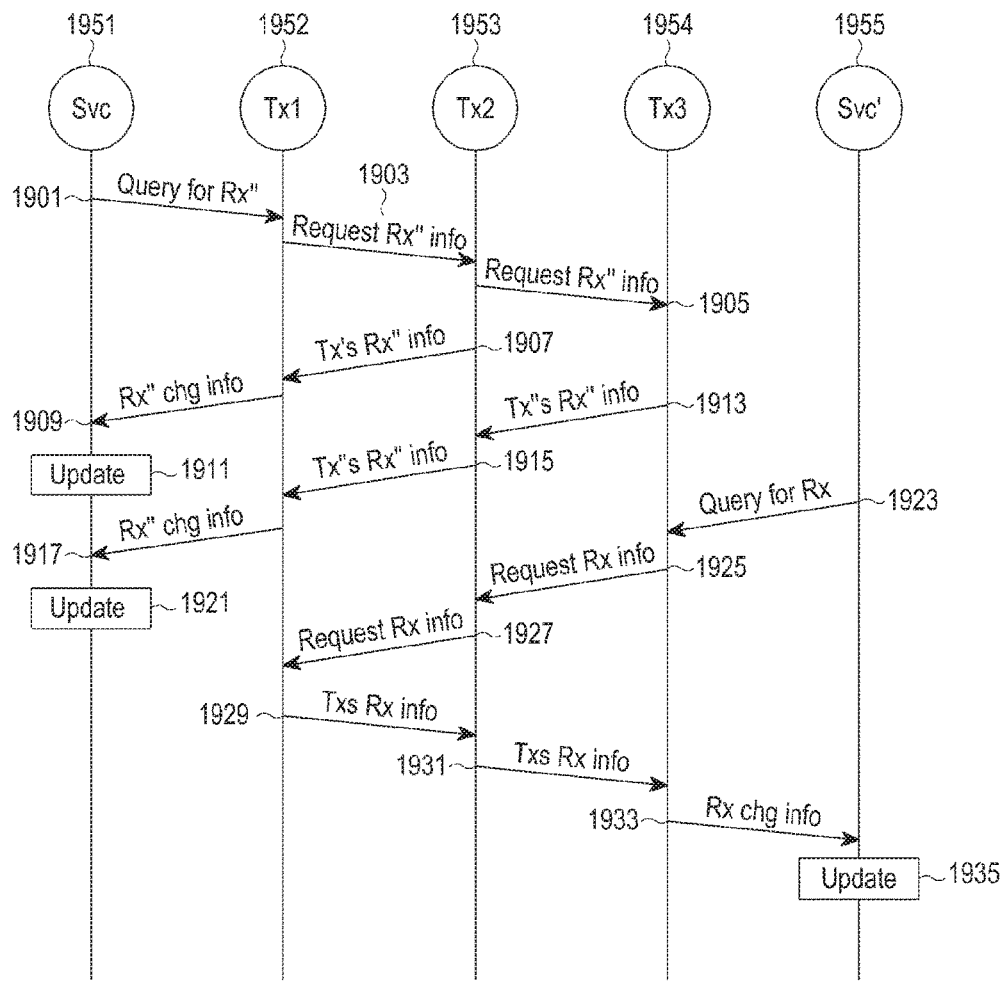
FIG. 19 is a flowchart illustrating an information sharing process by a wireless power transmitting device, according to an embodiment of the present disclosure.
Figure 20:
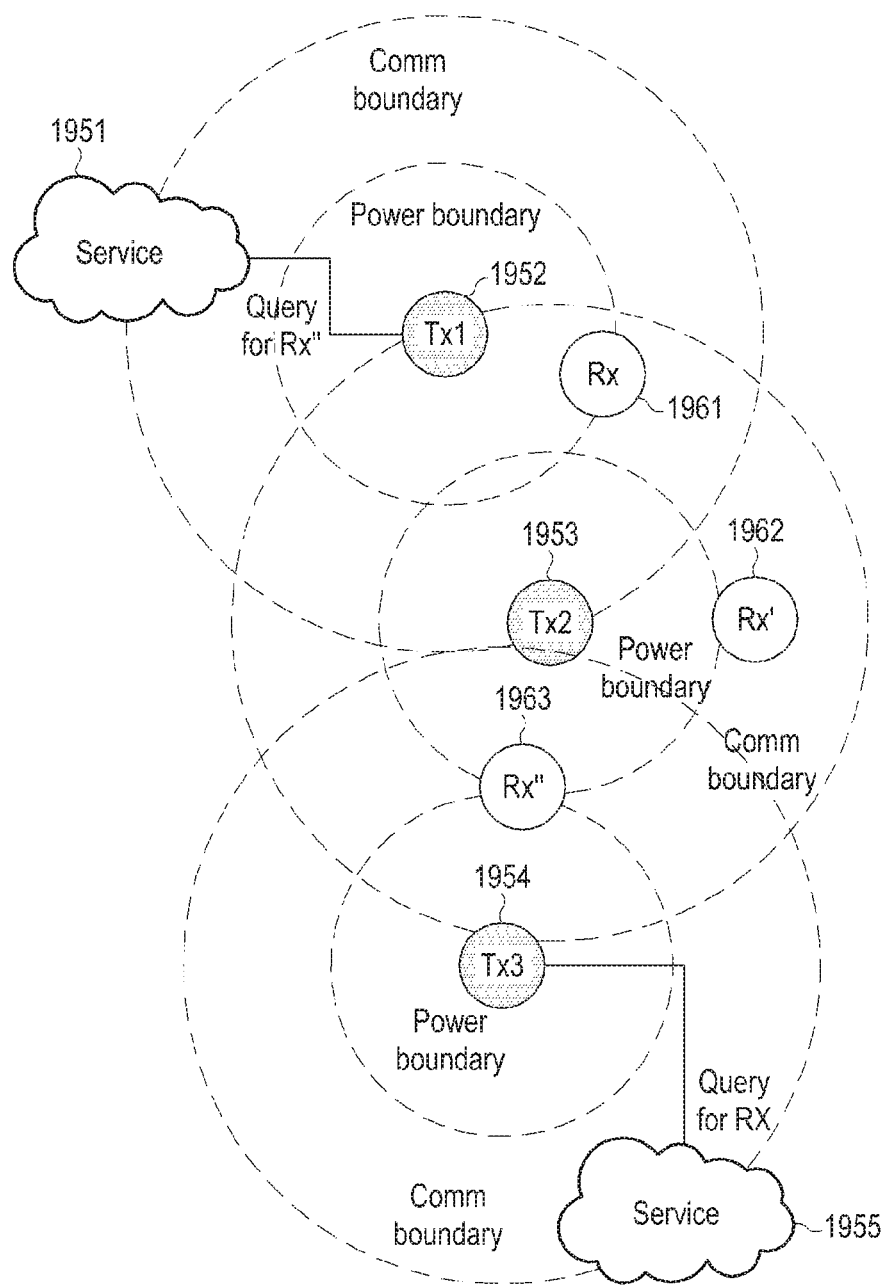
FIG. 20 is a diagram illustrating an information sharing process by a wireless power transmitting device, according to an embodiment of the present disclosure.

FIG. 19 is a flowchart illustrating an information sharing process by a wireless power transmitting device, according to an embodiment of the present disclosure. An embodiment is described in detail with reference to FIG. 19 and FIG. 20. FIG. 20 is a concept view illustrating an information sharing process by a wireless power transmitting device, according to an embodiment of the present disclosure.

As illustrated in FIG. 19, in step 1901, a first wireless power transmitting device (TX1) 1952 receives a query for information related to a wireless power receiving device (RX") 1963 from a service request device (SVC) 1951. For example, the service request device (SVC) 1951 may be the wireless power receiving device (RX") 1963 itself or may be implemented as various devices, such as, for example, a device performing billing for the charging of the wireless power receiving device (RX") 1963. Accordingly, the information related to the wireless power receiving device (RX") 1963 may also be implemented as various information, such as information about the position, information about the amount charged, or billing information corresponding to the amount charged, which has been determined on the wireless power receiving device (RX") 1963 by the wireless power transmitting device. The information about the amount charged or billing information may be determined based on the amount of power transmitted by the wireless power transmitting device or the amount of power received by the electronic device. The wireless power transmitting device may determine a billed amount based on the information about the amount of power received from the wireless power receiving device. For example, in the embodiment of FIG. 19, the service request device is assumed to request information about the amount charged for a particular wireless power receiving device (RX") 1963.

The SVC 1951 may send a query to the first wireless power transmitting device (TX1), as illustrated in FIG. 19. The SVC 1951 may send a query to one of the wireless power transmitting devices capable of communication. For example, the service request device 1951 may send out a query using short-range communication or using the Internet at a remote distance. Specifically, where the SVC 1951 is within a short-range communication range of the first wireless power transmitting device (TX1) 1952, the SVC 1951 may send out a query to the first wireless power transmitting device (TX1) 1952 using short-range communication. Where the first wireless power transmitting device (TX1) is determined to be the wireless power transmitting device capable of an Internet service among the plurality of wireless power transmitting devices TX1 to TX3, the service request device (SVC) 1951 may send a query to the first wireless power transmitting device (TX1) 1952. Accordingly, the service request device 1951 may request information about the wireless power receiving device (RX") 1963 at a remote site even when departing from the space where wireless power transmitting devices 1952, 1953, and 1954 are arranged.

Figure 22:
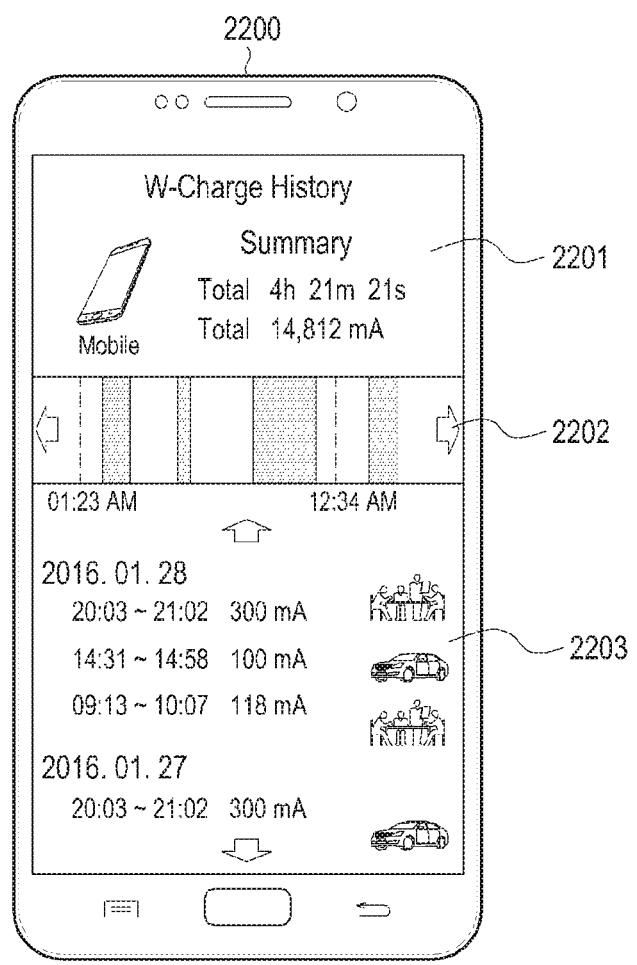
FIG. 22 is a diagram illustrating a screen related to a service, according to an embodiment of the present disclosure.

In step 1903, the first wireless power transmitting device (TX1) 1952 sends a request (request Rx" info) for the wireless power receiving device (RX") to the second wireless power transmitting device (TX2) 1953 in response to the received query. In step 1905, the second wireless power transmitting device (TX2) 1953 sends the received request (request Rx" info) for the wireless power receiving device (RX") 1963 to the third wireless power transmitting device (TX3) 1954. Specifically, as shown in FIG. 19, the wireless power transmitting devices may configure an ad-hoc network to freely communicate among nodes capable of communication without a particular master node. Each wireless power transmitting device may previously store a topology and forward the request (request Rx" info) for the wireless power receiving device (RX") to another wireless power transmitting device based on the topology. As set forth above, all of the wireless power transmitting devices in the topology may receive the request for the wireless power receiving device, and in response, all of the wireless power transmitting devices may respond with information about a particular wireless power receiving device. Thus, the service request device 1951 may receive all the information about the wireless power receiving device (RX") 1963. For example, the service request device 1951 may obtain all the information as to the amount charged for each wireless power transmitting device and may accordingly display an entire charging history on one screen as shown in FIG. 22.

If the second wireless power transmitting device (TX2) 1953 has a history of previously managing information about the wireless power receiving device, the second wireless power transmitting device (TX2) 1953 sends the same to the first wireless power transmitting device (TX1) 1952 having sent the query, in step 1907. For example, the second wireless power transmitting device (TX2) 1953 may send information (Tx2's Rx" info) about the particular wireless power receiving device (Rx") 1963 to the first wireless power transmitting device (TX1) 1952. In step 1909, the first wireless power transmitting device (TX1) 1952 sends information (Rx" chg info) about the amount charged for the particular wireless power receiving device (Rx") 1963 to the service request device 1951. In step 1911, the service request device 1951 may update the received information (Rx" chg info) about the amount charged.

In step 1913, the third wireless power transmitting device (TX3) 1954 also sends information (Tx3's Rx" info) about the particular wireless power receiving device (Rx") 1963 to the second wireless power transmitting device (TX2) 1953 having sent the query. In step 1915, the second wireless power transmitting device (TX2) 1952 forwards information (Tx3's Rx" info) about the particular wireless power receiving device (Rx") 1963 to the first wireless power transmitting device (TX1) 1952. In step 1917, the first wireless power transmitting device (TX1) 1952 sends the received charging information (chg info) about the particular wireless power receiving device (Rx") 1963 to the service request device 1951. In step 1921, the service request device 1951 updates the received information (Rx" chg info) about the amount charged.

In step 1923, another SVC' 1955 sends a query requesting information about the wireless power receiving device (Rx) 1961 to the third wireless power receiving device (TX3) 1954. In step 1925, the third wireless power transmitting device (TX3) 1954 transfers the query to the second wireless power transmitting device (TX2) 1953 based on the topology. In step 1927, the second wireless power transmitting device (TX2) 1953 delivers the received query to the first wireless power transmitting device (TX1) 1952. In step 1929, the first wireless power transmitting device (TX1) 1952 sends the information (Txs Rx info) about the wireless power receiving device (Rx) 1961 to the second wireless power transmitting device (TX2) 1953. In step 1931, the second wireless power transmitting device (TX2) 1953 transfers the received information (Txs Rx info) about the wireless power receiving device (Rx) 1961 to the third wireless power transmitting device (TX3) 1954. In step 1933, the third wireless power transmitting device (TX3) 1954 transfers the received information (Txs Rx info) about the wireless power receiving device (Rx) 1961 to the other SVC' 1955. In step 1935, the other service request device (service, SVC') 1955 updates the received information (Rx chg info) about the amount charged.

As described above, the service request devices may send a request for information about a particular wireless power receiving device to various wireless power transmitting devices, and a wireless power transmitting device may share the request with another wireless power transmitting device. The wireless power transmitting device may provide the received information about the wireless power receiving device to the service request device in a reverse direction of the path of the reception. As described above, the SVC 1951 may receive information related to a particular wireless power receiving device from all of the wireless power transmitting devices arranged in an area of interest. For example, where the user desires to grasp a charging history and a sum of billing information for a particular wireless power receiving device, the SVC 1951 may gather the billing information and charging history of the wireless power receiving device from all the electronic devices in the area of interest and provide a user interface (UI) reflecting the same to the user. In particular, where the wireless power receiving device is capable of an Internet service, the SVC 1951, although departing from the area of interest, may remotely acquire the information related to the wireless power receiving device from all of the wireless power transmitting devices within the area of interest.

Figure 21:
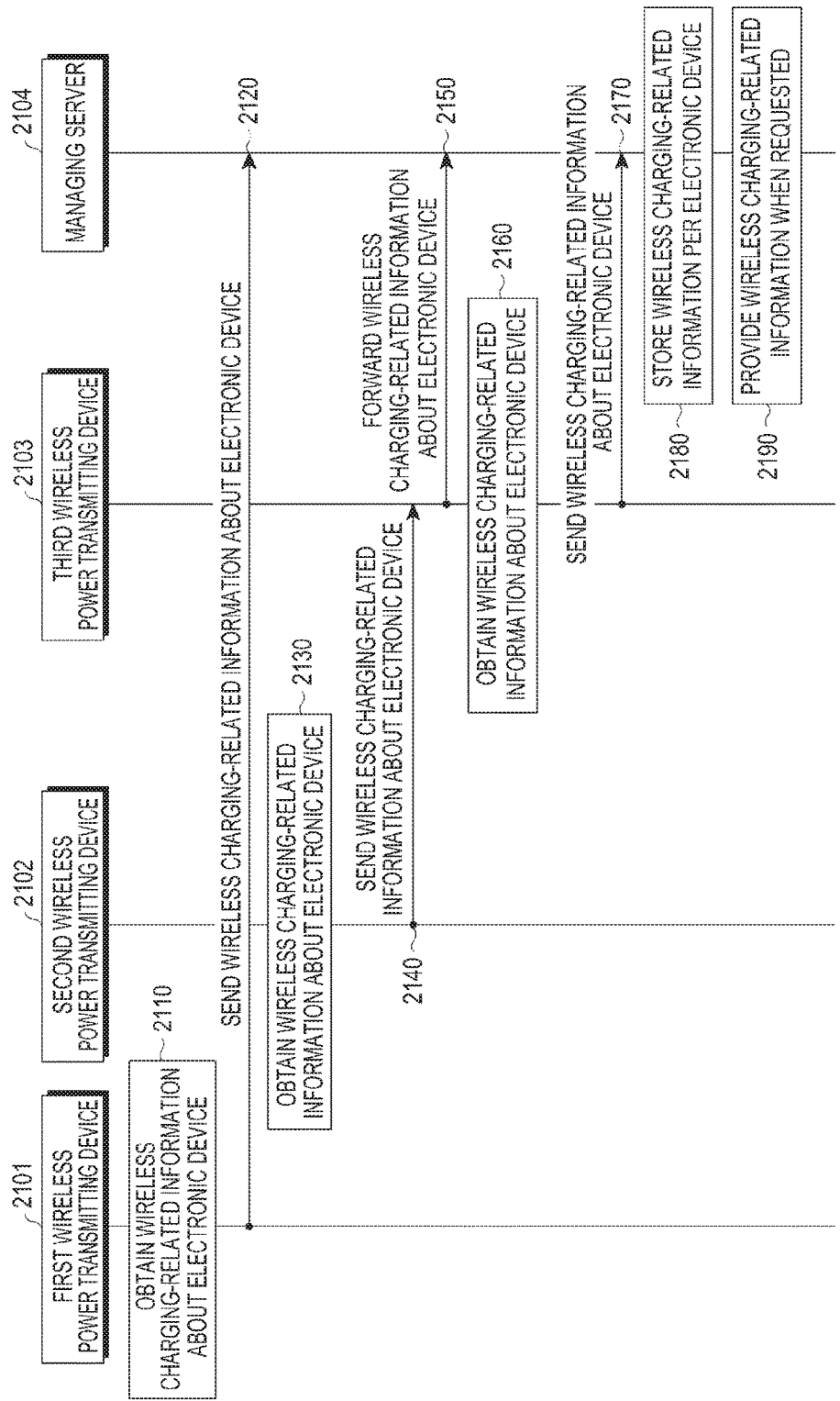
FIG. 21 is a flowchart illustrating information sharing by a wireless power transmitting device, according to an embodiment of the present disclosure.

FIG. 21 is a flowchart illustrating information sharing by a wireless power transmitting device, according to an embodiment of the present disclosure.

In step 2110, a first wireless power transmitting device 2101 obtains wireless charging-related information about a particular electronic device. For example, the first wireless power transmitting device 2101 may store the wireless charging-related information about the particular electronic device while wirelessly charging the particular electronic device. The first wireless power transmitting device 2101 may store the amount of power sent to the particular electronic device or time of charging or information about power received from the particular electronic device. In step 2120, the first wireless power transmitting device 2101 sends the wireless charging-related information about the particular electronic device to a managing server 2104. According to an embodiment of the present disclosure, the first wireless power transmitting device 2101 may send the wireless charging-related information to a gateway capable of Internet communication, and the gateway may forward the received wireless charging-related information to the managing server 2104. Specifically, a relay device may be added between the wireless power transmitting device and the managing server 2104. The managing server 2104 may manage the information about the wireless power receiving device per wireless power transmitting device in association therewith. The managing server 2104 may be implemented as a server independently separated from the wireless power transmitting device or may be included in at least one of the wireless power transmitting devices. The managing server 2104 may be capable of Internet communication and may request and provide services. For example, the managing server 2104 may receive a request for a service for billing information and a charging history regarding a particular electronic device from a service request device. The managing server 2104 may provide a service of offering the billing information and charging history for a particular electronic device that it manages to the service request device. As set forth above, the service may mean provision of information that the wireless power transmitting device has grasped for the electronic device, such as the charging history for the electronic device, billing information, and information about the position of the electronic device.

In step 2130, a second wireless power transmitting device 2102 obtains wireless charging-related information about a particular electronic device. In step 2140, the second wireless power transmitting device 2102 sends the wireless charging-related information about the electronic device to a third wireless power transmitting device 2103. For example, the second wireless power transmitting device 2102 may be a hardware device incapable of directly sending information to the managing server 2104. In this case, the second wireless power transmitting device 2102 may request the managing server 2104 to forward information to the third wireless power transmitting device 2103 which is another wireless power transmitting device capable of information transmission. In step 2150, the third wireless power transmitting device 2103 sends the wireless charging-related information about the particular electronic device of the second wireless power transmitting device 2102 to the managing server 2104.

In step 2160, the third wireless power transmitting device 2103 obtains wireless charging-related information about a particular electronic device. In step 2170, the third wireless power transmitting device 2103 sends the wireless charging-related information about the electronic device to a managing server 2104.

In step 2180, the managing server 2104 stores the wireless charging-related information per electronic device. For example, the managing server 2104 may store the wireless charging-related information as shown in Table 1 below:

TABLE 1

| Wireless power receiving device | Wireless power transmitting device having conducted charging | Amount charged (Wh) | Time charged | Amount billed |
|---|---|---|---|---|
| First wireless power receiving device | First wireless power transmitting device | 30 | 2016 Apr. 13. 13,00~13,15 | 21 |
| | Second wireless power transmitting device | 45 | 2016 Apr. 13. 13,15~13,24 | 44 |
| | Third wireless power transmitting device | 10 | 2016 Apr. 13. 13,24~13,28 | 11 |
| Second wireless power receiving device | First wireless power transmitting device | 24 | 2016 Apr. 13. 11,00~11,10 | 18 |
| | Fifth wireless power transmitting device | 5 | 2016 Apr. 13. 11,10~11,12 | 5 |
| | Sixth wireless power transmitting device | 3 | 2016 Apr. 13. 11,12~11,13 | 3 |
| Third wireless power receiving device | First wireless power transmitting device | 22 | 2016 Apr. 13. 13,00~13,15 | 17 |
| | Sixth wireless power transmitting device | 3 | 2016 Apr. 13. 13,00~13,15 | 3 |
| | Seventh wireless power transmitting device | 17 | 2016 Apr. 13. 13,00~13,15 | 14 |

In step 2190, the managing server 2104, upon receiving a request for wireless charging-related information, provides requested target information. For example, when receiving a request for the amount billed for the second wireless power receiving device from the service request device (e.g., a user electronic device), the managing server 2104 may provide the information of the amount billed of 18+5+3. The managing server 2104 may directly receive a request for wireless charging-related information from the wireless power receiving device. For example, as shown in FIG. 22, an electronic device 2200 displays a total amount charged 2201. FIG. 22 is a diagram illustrating a screen related to a service, according to an embodiment of the present disclosure. An electronic device may display a control bar 2202 capable of navigating a charging history. As per the user's input to the control bar 2202, the time displayed on a charging history window 2203 may be varied. The charging history window 2203 may include, for example, icons indicating the amount charged per time and the wireless power receiving device.

Figure 23A:
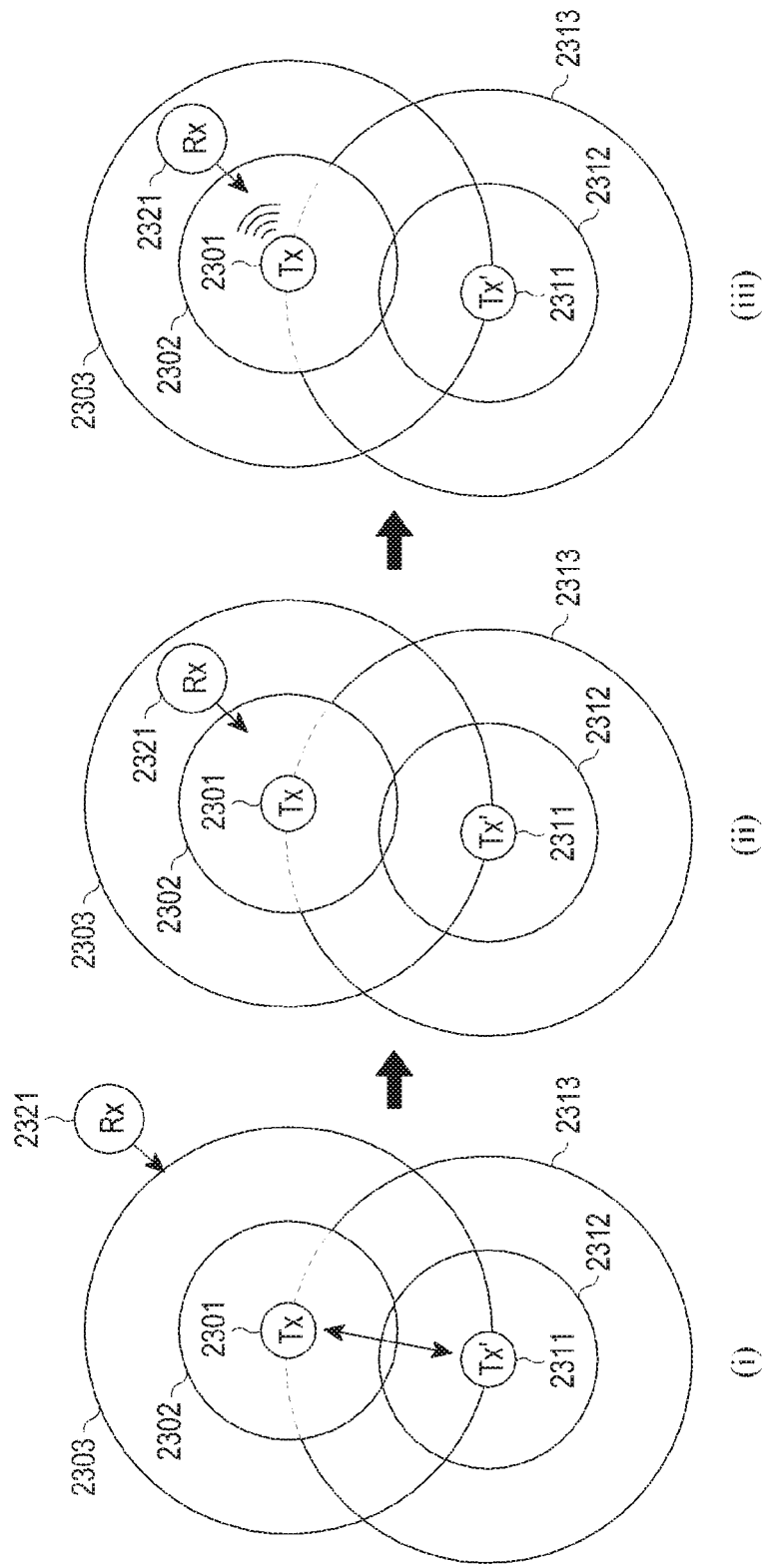
FIGS. 23A to 23C are diagrams illustrating a wireless power transmitting device and operations of the wireless power transmitting device, according to an embodiment of the present disclosure.
Figure 23B:
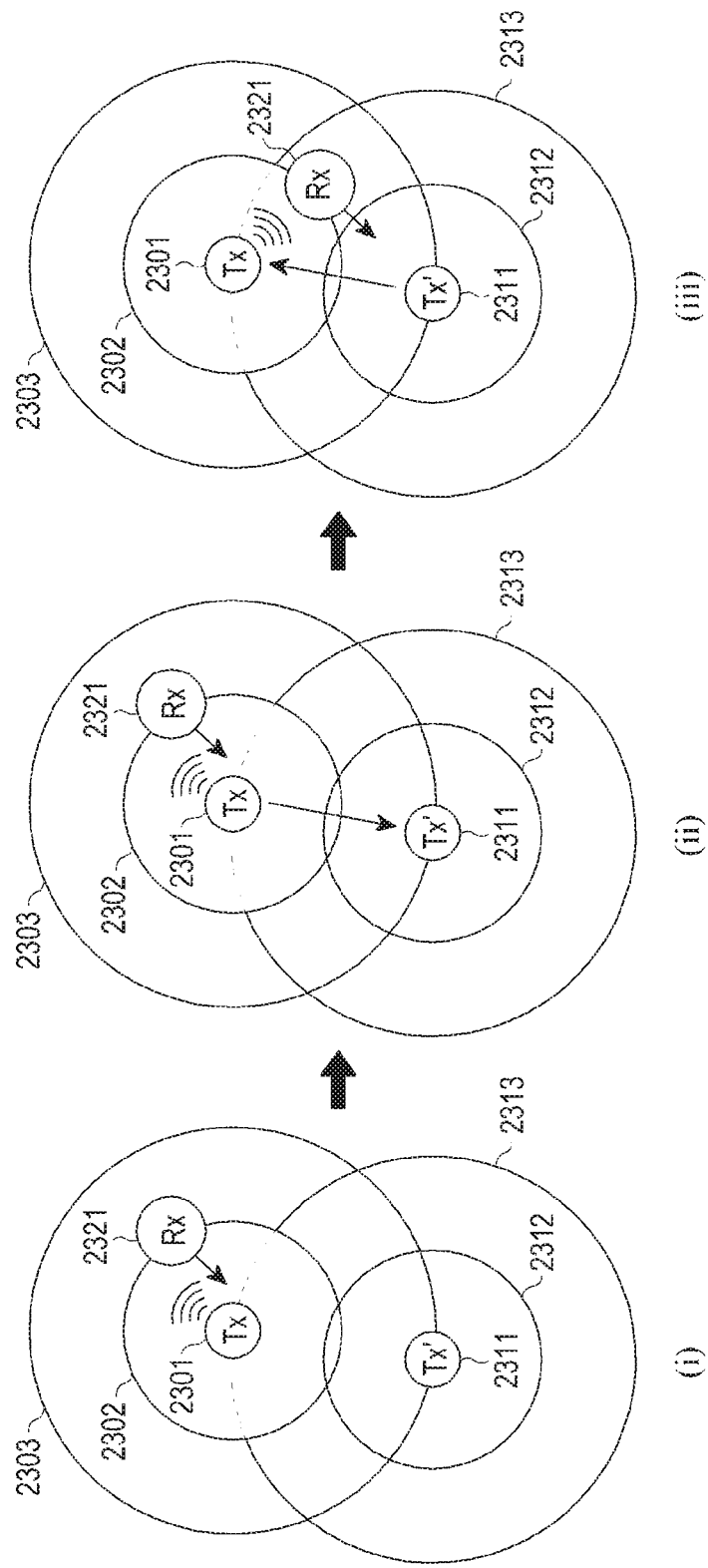
Figure 23C:
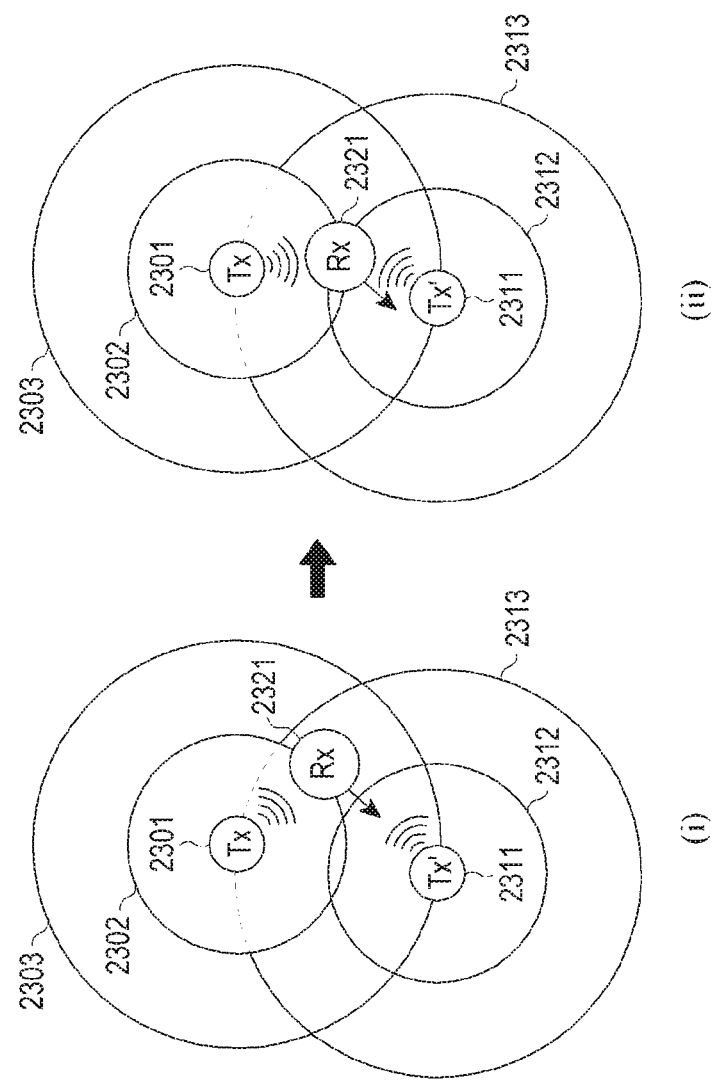

FIGS. 23A to 23C are concept views illustrating charging according to an embodiment of the present disclosure.

Referring to FIG. 23A, a wireless power transmitting device 2301 performs wireless charging within a power boundary 2302 and performs communication within a communication boundary 2303. A wireless power transmitting device 2311 performs wireless charging within a power boundary 2312 and performs communication within a communication boundary 2313. The wireless power transmitting device 2311 may perform bi-lateral communication with the wireless power transmitting device 2301. Meanwhile, an electronic device 2321 positioned outside the communication boundary 2303 at (i) enters into the communication boundary 2303 at (ii). In this case, as denoted at (iii), the wireless power transmitting device 2301 performs communication with the entering electronic device 2321. The wireless power transmitting device 2301 may identify the direction or position of the electronic device 2331. For example, the wireless power transmitting device 2301 may determine at least one of the position and direction of the electronic device 2321 using a communication signal from the electronic device 2321. The wireless power transmitting device 2301 may determine the position of the electronic device 2321 to form an RF wave for test. The wireless power transmitting device 2301 may determine whether the electronic device 2321 is present within the power boundary 2302 using received power-related information contained in the communication signal received from the electronic device 2321. For example, the electronic device 2321 may be positioned outside the power boundary 2302, and accordingly, the Received power-related information (e.g., the voltage at the rear end of the rectifier), may be not more than a preset threshold. Thus, the wireless power transmitting device 2301 may determine that the electronic device 2321 is positioned outside the power boundary 2302.

As shown in FIG. 23B, the electronic device 2321 enters into the power boundary 2302 at (i). In this case, the electronic device 2321 may receive sufficient power from the wireless power transmitting device 2301 (e.g., the voltage at the rear end of the rectifier may also exceed the preset threshold). Therefore, the wireless power transmitting device 2301 may determine that the electronic device 2321 enters into the power boundary 2302 using the received power-related information contained in the communication signal from the electronic device 2321. The wireless power transmitting device 2301 may continue to charge the electronic device 2321. As denoted at (ii), information related to the electronic device 2321 is sent to the wireless power transmitting device 2311 for performing a handoff. For example, the wireless power transmitting device 2301 may send, to the wireless power transmitting device 2311, identification information about the electronic device 2321, capability information, charging-related information, such as the amount of power charged, or time charged, and information about at least one of the position and direction of the electronic device 2321. Meanwhile, the electronic device 2321 moves to the wireless power transmitting device 2311 at (iii) and falls within the communication boundary 2313. In this case, the wireless power transmitting device 2311 may perform communication with the electronic device 2321 and inquire and receive information related to the electronic device 2321 from the wireless power transmitting device 2301.

Referring to FIG. 23C, the wireless power transmitting device 2311 performs communication with the electronic device 2321 at (i). Further, the wireless power transmitting device 2311 may form a RF wave for test for the electronic device 2321 using at least one of the direction and position of the electronic device 2321 received from the wireless power transmitting device 2301. The electronic device 2321 may send the received power-related information to the wireless power transmitting device 2311. The wireless power transmitting device 2311 may charge the electronic device 2321 using the received power-related information. Meanwhile, the electronic device 2321 moves to the area where the power boundaries 2302 and 2312 overlap at (ii), in which case the electronic device 2321 may simultaneously receive power from the wireless power transmitting devices 2301 and 2311. Further, the wireless power transmitting device 2301 may hand the electronic device 2321 off to the wireless power transmitting device 2311.

According to an embodiment of the present disclosure, the wireless power transmitting device 2301 may receive information about the maximum magnitude of power as receivable from the electronic device 2321 and the amount charged. In this case, the wireless power transmitting device 2301 may charge the electronic device 2321 using the received information. The wireless power transmitting device 2301 may perform communication with the wireless power transmitting device 2311 so that they may cooperatively conduct charging to the extent not exceeding the magnitude of power receivable by the electronic device 2321.

According to an embodiment of the present disclosure, a storage medium is provided that stores commands executed by at least one processor to enable the at least one processor to perform at least one operation that may include receiving information about a position of an electronic device from another wireless power transmitting device and transmitting power to the electronic device using the information about the position of the electronic device received from the other wireless power transmitting device.

According to an embodiment of the present disclosure, a storage medium is provided that stores commands executed by at least one processor to enable the at least one processor to perform at least one operation that may include receiving a first communication signal from an electronic device, determining a direction in which the electronic device is positioned based on a time of reception of the first communication signal by each of the plurality of communication antennas, transmitting the power to the electronic device using the direction in which the electronic device is positioned, and sending a second communication signal including the direction in which the electronic device is positioned to another wireless power transmitting device.

According to an embodiment of the present disclosure, a storage medium is provided that stores commands executed by at least one processor to enable the at least one processor to perform at least one operation that may include receiving power from a first wireless power transmitting device, sending a handoff request signal to the first wireless power transmitting device upon determining that at least one of a current, a voltage, and a power at a point of the electronic device is less than a preset threshold, and receiving power from a second wireless power transmitting device different from the first wireless power transmitting device after sending the handoff request signal.

The above-described commands may be stored in an external server and may be downloaded and installed on an electronic device, such as a wireless power transmitting device. In other words, according to an embodiment of the present disclosure, the external server may store commands that are downloadable by the wireless power transmitting device.

As is apparent from the foregoing description, a wireless power transmitting device is provided that is capable of sharing information about the position of an electronic device with another wireless power transmitting device and method for controlling the same. A wireless power transmitting device is provided that enables an electronic device being charged to hand off to another wireless power transmitting device and method for controlling the same.

While the disclosure has been shown and described with reference to certain preferred embodiments thereof, it will be understood by those skilled in the art that various changes in form and detail may be made therein without departing from the spirit and scope of the disclosure as defined by the appended claims.

What is claimed is:

1. A first wireless power transmitting device, comprising:
   a plurality of power transmission antennas;
   a communication circuit; and
   a processor configured to:
   control to receive, through the communication circuit, information about a first direction of a second wireless power transmitting device toward an electronic device from the second wireless power transmitting device,
   identify a second direction of the first wireless power transmitting device toward the electronic device using the first direction, and
   control to wirelessly transmit, through the plurality of power transmission antennas, power to the second direction for charging the electronic device.

2. The first wireless power transmitting device of claim 1, wherein the processor is further configured to control to form, through the plurality of power transmission antennas, a radio frequency (RF) wave in the second direction and determine whether or not to adjust a magnitude of the RF wave using received power-related information of the electronic device that is received through the communication circuit, while forming the RF wave.

3. The first wireless power transmitting device of claim 2, wherein the processor is further configured to maintain the magnitude of the RF wave when the received power-related information of the electronic device meets a preset condition, and to adjust the magnitude of the RF wave when the received power-related information of the electronic device does not meet the preset condition.

4. The first wireless power transmitting device of claim 1, wherein the processor is further configured to transmit, through the plurality of power transmission antennas, the power to the electronic device using the first direction, a position of the first wireless power transmitting device, and a position of the second wireless power transmitting device.

5. The first wireless power transmitting device of claim 1, wherein the processor is further configured to receive, through the communication circuit, a position of the electronic device with respect to the second wireless power transmitting device, and wherein the processor is further configured to determine the position of the electronic device with respect to the first wireless power transmitting device using a position of the electronic device with respect to the second wireless power transmitting device, a position of the second wireless power transmitting device, and a position of the first wireless power transmitting device, and to control the plurality of power transmission antennas to transmit the power to the electronic device based on the position of the electronic device with respect to the first wireless power transmitting device.

6. The first wireless power transmitting device of claim 1, wherein the first wireless power transmitting device is further configured to receive the position of the electronic device with respect to a point in an area where the first wireless power transmitting device and the second wireless power transmitting device are positioned, and wherein the processor is further configured to control the plurality of power transmission antennas to transmit the power to the electronic device based on a position of the electronic device with respect to the second wireless power transmitting device.

7. The first wireless power transmitting device of claim 1, further comprising a memory configured to store information about charging of the electronic device including at least one of a time charged, an amount charged, and an amount billed for the electronic device.

8. The first wireless power transmitting device of claim 7, wherein, upon receiving a request for the information about the charging of the electronic device, the processor is further configured to provide, through the communication circuit, the information about the charging of the electronic device or send the information about the charging of the electronic device to a managing server.

9. The first wireless power transmitting device of claim 1, wherein the processor is further configured to control initiation of the transmission of the power to the electronic device when a handoff signal for the electronic device is received from the second wireless power transmitting device through the communication circuit.

10. A second wireless power transmitting device, comprising:
    a plurality of power transmission antennas;
    a plurality of communication antennas; and
    a processor configured to:
    receive, through each of the plurality of communication antennas, a first communication signal from an electronic device,
    determine a direction toward which the electronic device is positioned based on each of a plurality of time points for reception of the first communication signal by each of the plurality of communication antennas,
    control to transmit, through the plurality of power transmission antennas, power to the electronic device using the direction toward which the electronic device is positioned, and
    send a second communication signal including the direction a first wireless power transmitting device.

11. The second wireless power transmitting device of claim 10, wherein the processor is further configured to determine a distance from the second wireless power transmitting device to the electronic device and send a third communication signal including the distance to the other wireless power transmitting device.

12. The second wireless power transmitting device of claim 11, wherein the processor is further configured to compare a transmission strength included in the first communication signal with a reception strength of the first communication signal, and determine the distance according to a result of the comparison.

13. The second wireless power transmitting device of claim 11, wherein the processor is further configured to form, through the plurality of power transmission antennas, a radio frequency (RF) wave in the direction toward which the electronic device is positioned, and determine the distance using received power-related information of the electronic device that is received from the plurality of communication antennas upon forming the RF wave.

14. The second wireless power transmitting device of claim 13, wherein the processor is further configured to maintain a magnitude of the RF wave when the received power-related information of the electronic device meets a preset condition, and to adjust the magnitude of the RF wave when the received power-related information of the electronic device does not meet the preset condition.

15. The second wireless power transmitting device of claim 10, wherein the processor is further configured to send a handoff signal to the other wireless power transmitting device through the plurality of communication antennas when a handoff condition is met.

16. The second wireless power transmitting device of claim 15, wherein the plurality of communication antennas is further configured to receive a fourth communication signal including received power-related information of the electronic device, and wherein the processor is further configured to send the handoff signal when at least one of a current, a voltage, and a power included in the received power-related information is less than a preset threshold.

17. The second wireless power transmitting device of claim 15, wherein the processor is further configured to stop transmitting the power after sending the handoff signal.

18. The second wireless power transmitting device of claim 15, wherein the processor is further configured to stop transmitting the power when a handoff complete signal is received through the plurality of communication antennas.

* * * * *